United States Patent
McDonell

(10) Patent No.: US 7,052,033 B2
(45) Date of Patent: May 30, 2006

(54) TRAILER ASSEMBLY

(76) Inventor: Lindsay McDonell, 6556 N. Ponchartrain Blvd., Chicago, IL (US) 60646

( * ) Notice: Subject to any disclaimer, the term of this patent is extended or adjusted under 35 U.S.C. 154(b) by 283 days.

(21) Appl. No.: 10/699,782

(22) Filed: Nov. 4, 2003

(65) Prior Publication Data

US 2005/0093273 A1     May 5, 2005

(51) Int. Cl.
  *B62D 61/02*     (2006.01)
(52) U.S. Cl. .................... 280/656; 280/639; 296/181.7
(58) Field of Classification Search ...................... None
  See application file for complete search history.

(56) References Cited

U.S. PATENT DOCUMENTS

| | | | |
|---|---|---|---|
| 2,628,733 A | 2/1953 | Hale | |
| 2,691,546 A * | 10/1954 | Torrance | 296/181.7 |
| 2,720,413 A | 10/1955 | Halverson | |
| 2,984,514 A | 5/1961 | Lemley | |
| 3,582,131 A * | 6/1971 | Brown | 296/26.02 |
| 3,945,521 A | 3/1976 | Decker | |
| 4,057,282 A * | 11/1977 | Kidd | 296/10 |
| 4,126,324 A * | 11/1978 | Browning | 280/42 |
| 4,175,768 A * | 11/1979 | Thackray | 280/652 |
| 4,239,258 A * | 12/1980 | Burris | 280/639 |
| 4,695,087 A | 9/1987 | Hollrock | |
| 4,758,008 A | 7/1988 | Moddejonge | |
| 4,786,073 A * | 11/1988 | Harper | 280/656 |
| 5,259,720 A * | 11/1993 | Lobner | 414/483 |
| 5,979,926 A | 11/1999 | Fallert | |
| 6,095,588 A | 8/2000 | Rodosta | |
| 6,254,117 B1 * | 7/2001 | Cross | 280/401 |
| 6,378,893 B1 * | 4/2002 | Jager | 280/656 |
| 6,474,714 B1 * | 11/2002 | Stettner | 296/26.08 |
| 6,585,285 B1 * | 7/2003 | Koch | 280/656 |
| 6,834,882 B1 * | 12/2004 | Boyd | 280/656 |
| 6,846,003 B1 * | 1/2005 | Thompson | 280/656 |

* cited by examiner

*Primary Examiner*—Christopher P. Ellis
*Assistant Examiner*—Christopher Bottorff
(74) *Attorney, Agent, or Firm*—Berenato, White & Stavish LLC

(57) ABSTRACT

A trailer assembly is provided that includes a bed subassembly having a plurality of sections movably coupled to one another for permitting movement between an extended configuration and a folded configuration. In an embodiment, in the folded configuration the plurality of sections collectively form a bottom surface, an upper surface, and surrounding side walls of an enclosable compartment, at least one of the sections having an access member movable between an open position for permitting access to the compartment and a closed position for enclosing the compartment as the sections are maintained in the folded configuration. The trailer assembly optionally may include a wheel subassembly and drawbar, which may be freely and independently rotatable relative to one another and the bed subassembly.

58 Claims, 17 Drawing Sheets

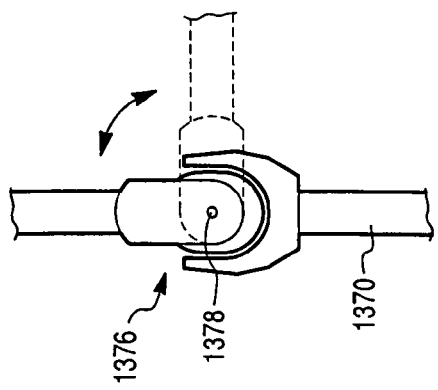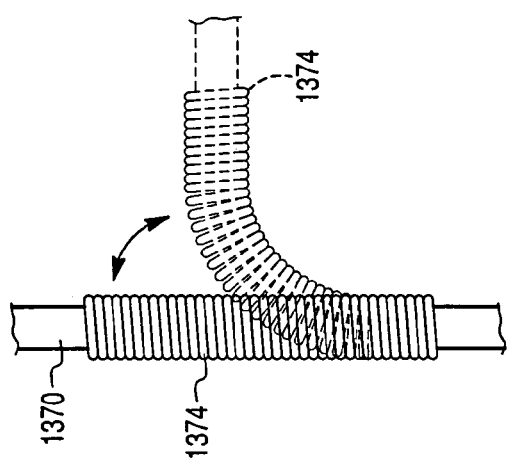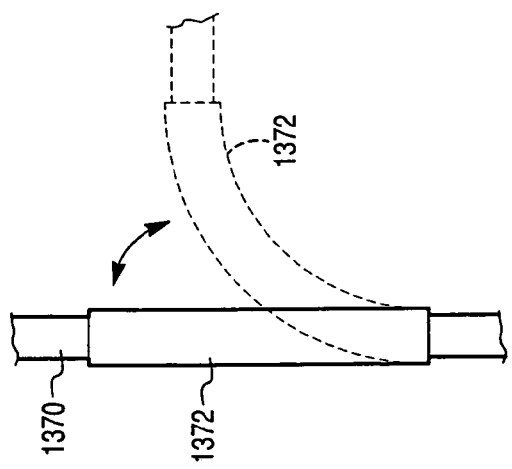

TRAILER ASSEMBLY

BACKGROUND OF THE INVENTION

1. Field of the Invention

This invention relates to trailer assemblies, including those designed to be hauled manually or behind vehicles, such as automobiles, motorcycles, vans, SUVs, trucks, tractors, and the like. This invention also relates to methods for making and using the trailer assemblies.

2. Description of the Related Art

Trailer assemblies commonly include a flat bed oriented substantially parallel to the ground, at least a pair of wheels on which the flat bed is carried and moved as the wheels roll across the ground, and a drawbar for mating with a vehicular hitch mechanism. The flat bed may be loaded with goods or other items to facilitate their transportation.

Trailer assemblies are found in various configurations and sizes, each designed for a particular use. For example, an open roof trailer assembly comprises an exposed flat bed and optionally side and end walls extending from and perpendicular to the perimeter of the flat bed. The absence of a roof can assist in loading and unloading of goods from the open flat bed, and may permit for the transportation of particularly bulky or tall goods and items. However, the roofless trailer sacrifices privacy and may raise security and safety concerns. On the other hand, an enclosed (or roofed) trailer assembly typically has an access door for permitting ingress and egress of goods and items to and from an enclosed compartment. The ability confine, conceal, and seal goods within the enclosed compartment provides safety and security advantages. However, the limited compartment size of an enclosed trailer configuration may restrict its ability to haul bulky or tall goods and may impede loading and unloading of the compartment.

3. Objects of the Invention

It is one object of this invention to provide a trailer assembly having sufficient versatility to provide the benefits and avoid drawbacks of the opened roof trailer assembly and the enclosed (roofed) trailer assembly.

It is another object of this invention to provide a trailer assembly foldable from an extended, roofless/open configuration to a folded configuration having an optimal compartment size.

It is still another object of this invention to provide a trailer assembly movable between an extended configuration and a folded configuration, the trailer assembly having at least one access member, e.g., door, through which the trailer compartment can be accessed when in the folded configuration.

It is a further object of this invention to provide a trailer assembly movable between an extended configuration and a folded configuration, wherein the trailer assembly in both its extended and folded configurations may be hauled manually or behind a vehicle.

It is still a further object of this invention to provide a trailer assembly positionable in an extended, roofless configuration and comprising means for facilitating loading and unloading of goods of the bed.

It is yet another object of this invention to provide methods for making the trailer assembly of the present invention.

It is another object of this invention to provide methods for moving a trailer assembly between an extended configuration and a folded configuration.

SUMMARY OF THE INVENTION

To achieve one or more of the foregoing objects, and in accordance with the purposes of the invention as embodied and broadly described in this document, according to a first aspect of this invention there is provided a trailer assembly comprising a bed subassembly comprising a plurality of sections movably coupled to one another for permitting movement between an extended configuration and a folded configuration. In the folded configuration the plurality of sections collectively form a bottom surface, an upper surface, and surrounding side walls of an enclosable compartment. At least one of the sections comprises a closable access member movable between an open position and a closed position for selectively permitting access to and sealing of the compartment, respectively, while the sections are maintained in the folded configuration.

According to a second aspect of the invention, a trailer assembly is provided, comprising a bed subassembly and a wheel subassembly for supporting and moving the bed subassembly along the ground. The bed subassembly comprises a forward section having a forward section inner surface and a forward gate positionable substantially transverse to the forward section inner surface, an intermediate section having an intermediate section inner surface, and an aft section having an aft section inner surface and an aft gate positionable substantially transverse to the aft section inner surface. The forward and aft sections are movably connected to the intermediate section between an extended configuration and a folded position. In the extended position, the intermediate section inner surface is interposed between and substantially parallel with the forward section inner surface and the aft section inner surface. In the folded configuration, the forward and aft section inner surfaces are in substantially transverse relationship to the intermediate section inner surface, and the forward, intermediate, and aft sections collectively form an enclosed compartment. A member selected from the group of the forward section, the aft section, and the intermediate section comprises a closable access member movable between an open position and a closed position for selectively permitting access to and sealing of the enclosed compartment, while the bed subassembly is maintained in the folded configuration.

In a preferred yet optional embodiment of the second aspect of the invention, the forward and aft gates are pivotal, when the trailer assembly is in the folded configuration, between the open position and a closed position. In the open position, the forward and aft gates face one another and are substantially parallel to the forward section inner surface and the aft section inner surface, respectively. In the closed position, the forward and aft gates are spaced apart from and face the intermediate section inner surface.

In accordance with a third aspect of the invention, a trailer assembly comprising a bed subassembly and a wheel subassembly is provided. The bed subassembly comprises a forward section comprising a forward section inner surface and a forward gate substantially transverse to the forward section inner surface, an aft section comprising an aft section inner surface and an aft gate substantially transverse to the aft section inner surface, and an intermediate section comprising an intermediate section inner surface. The forward and aft sections are movably connected to the intermediate section between an extended configuration, in which the intermediate section inner surface is interposed between and substantially parallel to the forward section inner surface and the aft section inner surface, and a folded configuration. In the folded configuration, the forward and aft section inner surfaces are in substantially transverse relationship to the intermediate section inner surface, and the forward, intermediate, and aft sections collectively form an enclosed compartment. The wheel subassembly rotatably supports the bed subassembly for moving the bed subassembly along the ground when in the extended and folded configurations. The wheel subassembly comprises first and second wheels for making contact with and moving across the ground, and a wheel-mount carriage on which the bed subassembly is rotationally mounted for rotating the bed subassembly at least 90 degrees relative to the wheel subassembly.

In a variation to the third aspect, the trailer assembly further comprises a drawbar mount operatively connected to the wheel-mount carriage to permit rotational movement of the drawbar mount relative to and independently of the wheel subassembly and the bed subassembly. The trailer assembly further comprises a drawbar connected to the drawbar mount for permitting pulling of the bed subassembly via the drawbar when in the extended and folded configurations.

According to a fourth aspect of the invention, trailer assembly movable between an extended configuration and a folded configuration is provided. The trailer assembly comprises a bed subassembly comprising an intermediate section, a forward section, and an aft section. The intermediate section comprises an intermediate platform structure having an intermediate platform inner surface, front and rear end portions opposite to one another, and opposite sides. The forward section comprises a forward platform inner surface and a forward end gate positionable in a closed position substantially transversely to the forward platform inner surface, the forward section being movably connected to the front end portion of the intermediate section to permit movement between the extended configuration, in which the forward platform inner surface is substantially parallel to the intermediate platform inner surface, and the folded configuration, in which the forward platform inner surface is above and substantially transverse to the intermediate platform inner surface and in which the forward end gate in the closed position is spaced apart from and faces the intermediate platform inner surface. The aft section comprises an aft platform inner surface and an aft end gate positionable in a closed position substantially transversely to the aft platform inner surface, the aft section being movably connected to the rear end portion of the intermediate section to permit movement between the extended configuration, in which the aft platform inner surface is substantially parallel to the intermediate platform inner surface, and the folded configuration. In the folded configuration, the aft platform inner surface is above and substantially transverse to the intermediate platform inner surface, and the aft end gate (in the closed position) is spaced apart from and faces the intermediate platform inner surface and is arranged in substantially non-overlapping relationship with the forward end gate.

In a preferred yet optional variant of the fourth aspect of the invention, the forward and aft end gates respectively comprise forward and aft distal edges remote from the forward and aft platform inner surfaces, respectively. The forward and aft distal edges abut one another in the folded configuration to establish a roof structure for the trailer assembly when the forward and aft sections are in the folded configuration.

A trailer assembly according to a fifth aspect of the invention comprises a bed subassembly comprising: (a) an intermediate section comprising (i) an intermediate platform structure comprising an intermediate platform inner surface, front and rear end portions opposite to one another, and opposite sides, and (ii) optionally first and second intermediate side panels situated on the opposite sides of the intermediate platform structure and positionable substantially transversely to the intermediate platform inner surface to face one another, the first intermediate side panel being rotatable away from the second intermediate side panel; (b) a forward section comprising (i) a forward platform structure comprising a forward platform inner surface, the forward section being rotatably connected to the front end portion of the intermediate section to permit rotational movement between the extended configuration, in which the forward platform inner surface is substantially parallel to the intermediate platform inner surface, and the folded configuration, in which the forward platform inner surface is above and substantially transverse to the intermediate platform inner surface, and (ii) optionally first and second forward side panels situated on opposite sides of the forward platform structure and positionable substantially parallel to the first and second intermediate side panels, respectively, and substantially transversely to the forward platform inner surface to face one another, the first forward side panel being rotatable away from the second forward side panel; and (c) an aft section comprising (i) an aft platform structure comprising an aft platform inner surface, the aft section being rotatably connected to the rear end portion of the intermediate section to permit rotational movement between the extended configuration, in which the aft platform inner surface is substantially parallel to the intermediate platform inner surface, and the folded configuration, in which the aft platform inner surface is above and substantially transverse to the intermediate platform inner surface, and (ii) optionally first and second aft side panels situated on opposite sides of the aft platform structure and positionable substantially parallel to the first and second intermediate side panels, respectively, and substantially transversely to the aft platform inner surface to face one another, the first aft side panel being rotatable away from the second aft side panel. The trailer assembly of this aspect of the invention includes at least one of the optional members selected from the group consisting of (a)(ii), (b)(ii), and (c)(ii).

According to a sixth aspect of the invention, a trailer assembly is provided comprising a bed subassembly, which comprises an intermediate section, a forward section, and an aft section. The intermediate section comprises an intermediate platform structure having an intermediate platform inner surface, front and rear end portions opposite to one another, and opposite sides. The forward section comprises a forward platform inner surface and a forward end gate positionable substantially transversely to the forward platform inner surface. The forward section is rotatably connected to the front end portion of the intermediate section to permit rotational movement between the extended configuration, in which the forward platform inner surface is substantially parallel to the intermediate platform inner surface, and the folded configuration, in which the forward platform inner surface is above and substantially transverse to the intermediate platform inner surface. The aft section comprises an aft platform inner surface and an aft end gate. The aft section is rotatably connected to the rear end portion of the intermediate section to permit rotational movement between the extended configuration, in which the aft platform inner surface is substantially parallel to the intermediate platform inner surface, and the folded configuration, in which the aft platform inner surface is above and substantially transverse to the intermediate platform inner surface. The aft end gate is pivotal relative to the aft end of the aft platform structure for raising the aft end gate to extend substantially transverse to the aft platform inner surface and to lower the aft end gate to lie in substantially parallel relationship with the aft platform inner surface when the trailer assembly is in both the extended and folded configurations.

According to an embodiment of the sixth aspect of the invention, the forward end gate is pivotal relative to the forward platform structure for raising the forward end gate to extend substantially transverse to the forward platform inner surface and for lowering the forward end gate to lie in substantially parallel relationship with the forward platform inner surface when the trailer assembly is in both the extended and folded configurations.

In accordance with a seventh aspect of the invention, a trailer assembly is provided comprising a bed subassembly, a wheel subassembly, and a drawbar. The bed subassembly comprises an intermediate section comprising an intermediate platform surface and first and second intermediate side panels situated on opposite sides of the intermediate platform surface, the first and second intermediate side panels being positionable substantially transversely to the intermediate platform inner surface to face one another. The bed subassembly further comprises a forward section comprising a forward platform inner surface, first and second forward side panels situated on opposite sides of the forward platform inner surface and positionable substantially transversely to the forward platform inner surface to face one another, and a forward end gate extending between the first and second forward side panels and positionable in a closed position substantially transversely to the forward platform inner surface. The forward section is movably connected to the intermediate section to permit rotational movement of the forward section between the extended configuration, in which the forward platform inner surface is substantially parallel to the intermediate platform inner surface, and the folded configuration, in which the forward platform inner surface is above and substantially transverse to the intermediate platform inner surface and in which the forward end gate in the closed position faces and is spaced apart from the intermediate panel inner surface. The bed subassembly still further comprises an aft section comprising an aft platform inner surface, first and second aft side panels situated on opposite sides of the aft platform inner surface and positionable substantially transversely to the aft platform inner surface to face one another, and an aft end gate extending between the first and second aft side panels and positionable in a closed position substantially transversely to the aft platform inner surface. The aft section is movably connected to the intermediate section to permit rotational movement of the aft section between the extended configuration, in which the aft platform inner surface is substantially parallel to the intermediate platform inner surface, and the folded configuration, in which the aft platform inner surface is above and substantially transverse to the intermediate platform inner surface and in which the aft end gate in the closed position faces and is spaced apart from the intermediate panel inner surface. The wheel subassembly carries the intermediate section. The drawbar is coupled to the intermediate section and retainable in an operative position substantially parallel with the intermediate section for pulling the bed and wheel subassemblies across the ground in both the extended configuration and the folded configuration.

A trailer assembly according to an eighth aspect of the invention comprises a trailer assembly comprising a bed subassembly, and a wheel subassembly for moving the bed subassembly along the ground. The bed subassembly comprises a forward section, an aft section, and an intermediate section each having a respective inner surface and a respective outer surface. The forward and aft sections are situated on opposite ends of and are movably connected to the intermediate section between an extended configuration, in which the inner surfaces of the forward, aft, and intermediate sections are substantially parallel with one another, and a folded configuration, in which the inner surfaces of the forward and aft sections are substantially transverse to the inner surface of the intermediate section. At least one member selected from the group consisting of the forward, aft, and intermediate sections comprises a plurality of apertures extending from the inner surface to the outer surface thereof. In a preferred yet optional embodiment, a first aperture of the forward section faces and is directly opposed to a second aperture of the aft section.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings:

FIGS. 17A, 17B, and 17C are alternative locking pin bending portions for the system of FIGS. 16A and 16B.

Figure 1:
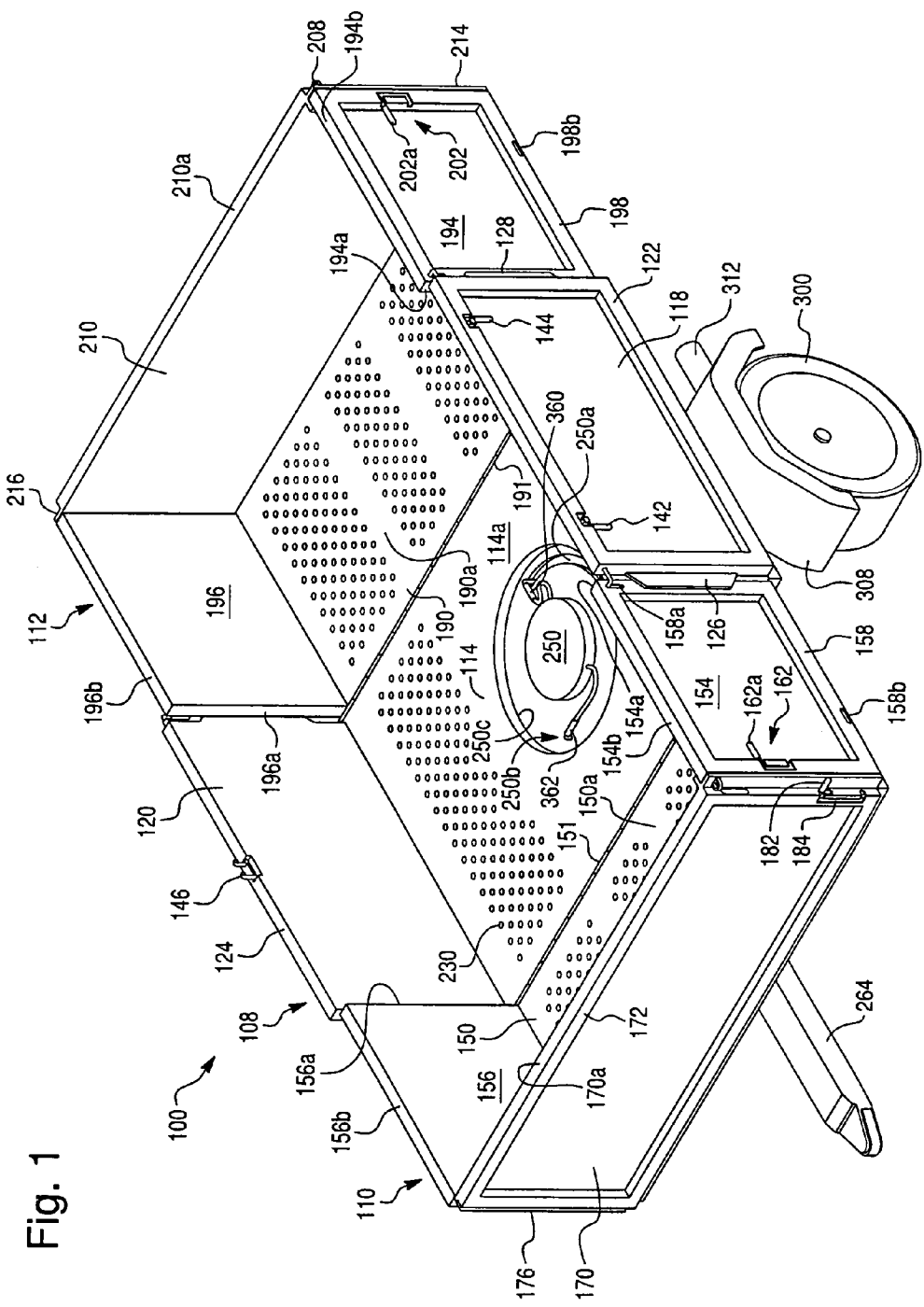
FIG. 1 is a front, upper perspective view of a trailer assembly comprising a bed subassembly, a wheel subassembly, and a drawbar according to an embodiment of the invention, in which the trailer assembly is in an extended configuration and forward and aft end gates of the bed subassembly are in closed positions.

DETAILED DESCRIPTION OF CERTAIN PREFERRED EMBODIMENTS AND METHODS OF THE INVENTION

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

The terms "left," "right," "forward," "aft," "front," "rear" and the like are used herein to assist in and facilitate the description of the invention and its principles and advantages. For the purposes of the detailed description, the reference for each of these terms is the arrangement and orientation of the trailer assembly as it is depicted in FIG. 1. The rotational capabilities of the bed and wheel subassemblies and the drawbar relative to one another make the designations of these terms to the various parts of the trailer assembly somewhat arbitrary. Accordingly, it should be understood that these terms are not to be considered limitations of the invention as the invention is defined in the claims and by equivalents of the claims, unless the context clearly dictates otherwise.

As referred to herein, a statement that a certain part is "positionable" means that a part is located or capable of being placed in a certain position, and that the part optionally but not necessarily may be moved to one or more alternative positions. For example, a statement that an end gate is positionable in a closed position optionally permits, without requiring, movement of the end gate into another position, such as an open position.

A trailer assembly according to an embodiment of the invention is generally designated by reference numeral 100 in FIG. 1. The illustrated trailer assembly 100 comprises a plurality of subassemblies, including in particular a bed subassembly 102, a wheel subassembly 104, and a drawbar 106.

Figure 2:
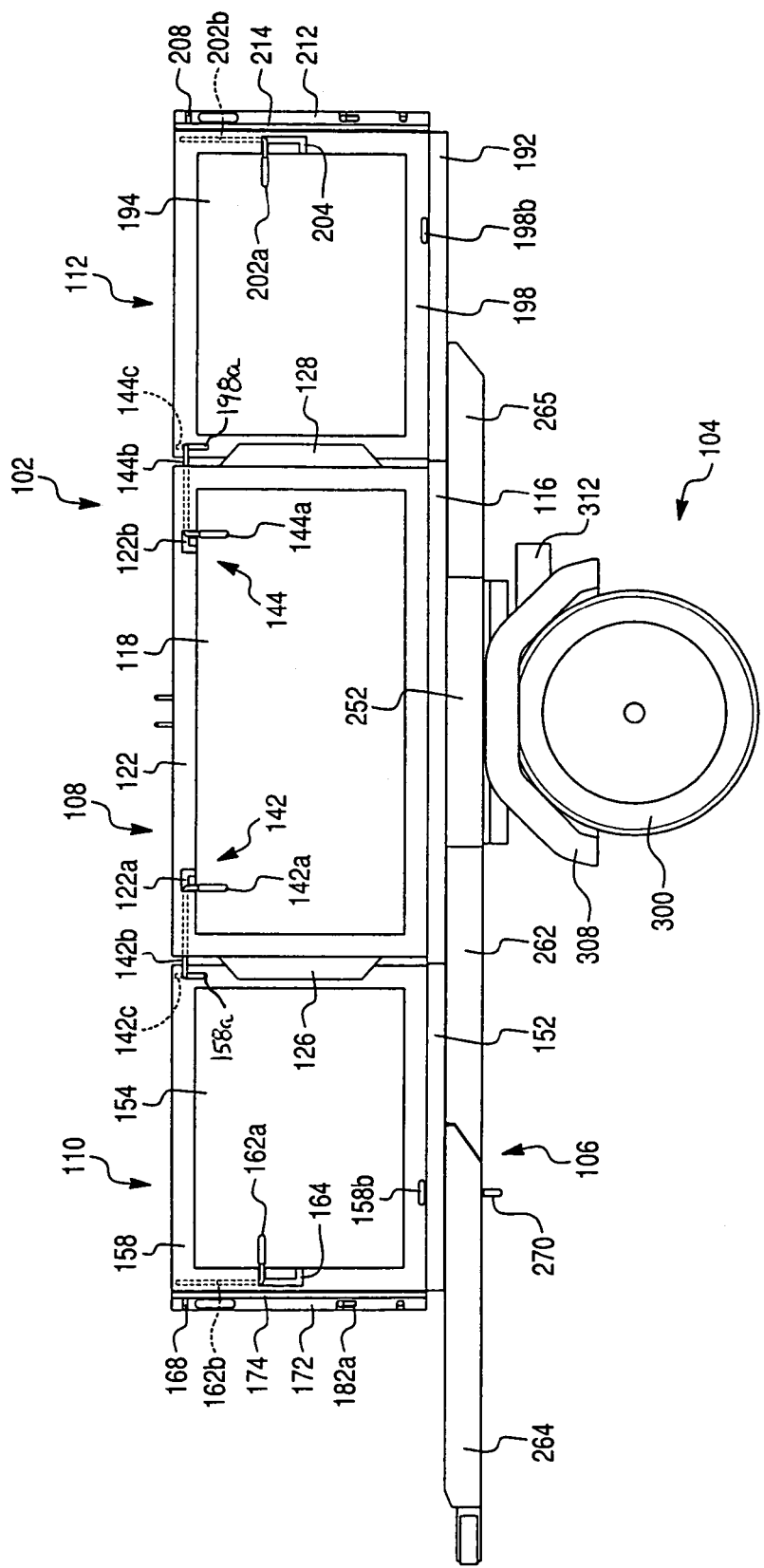
FIG. 2 is a view of the right side of the trailer assembly of FIG. 1.
Figure 3:
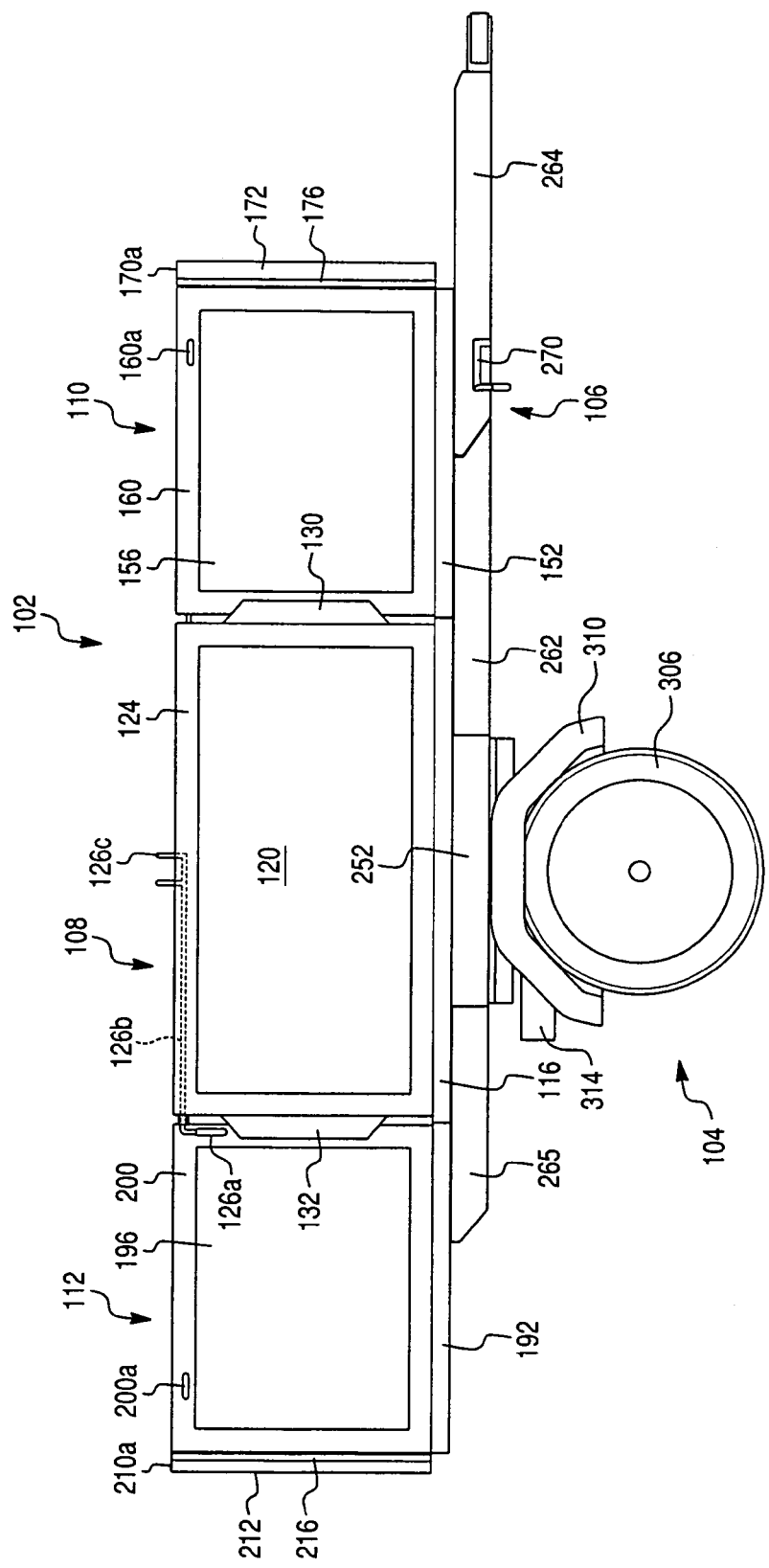
FIG. 3 is a view of the left side of the trailer assembly of FIG. 1.

FIGS. 1–5 and 7 depict the bed subassembly 102 in an extended configuration. Referring more specifically to FIGS. 1–3, the bed subassembly 102 comprises an intermediate section 108, a forward section 110 (arranged in front of the intermediate section 108 in FIG. 1), and an aft section 112 (arranged behind the intermediate section 108 in FIG. 1).

Figure 4:
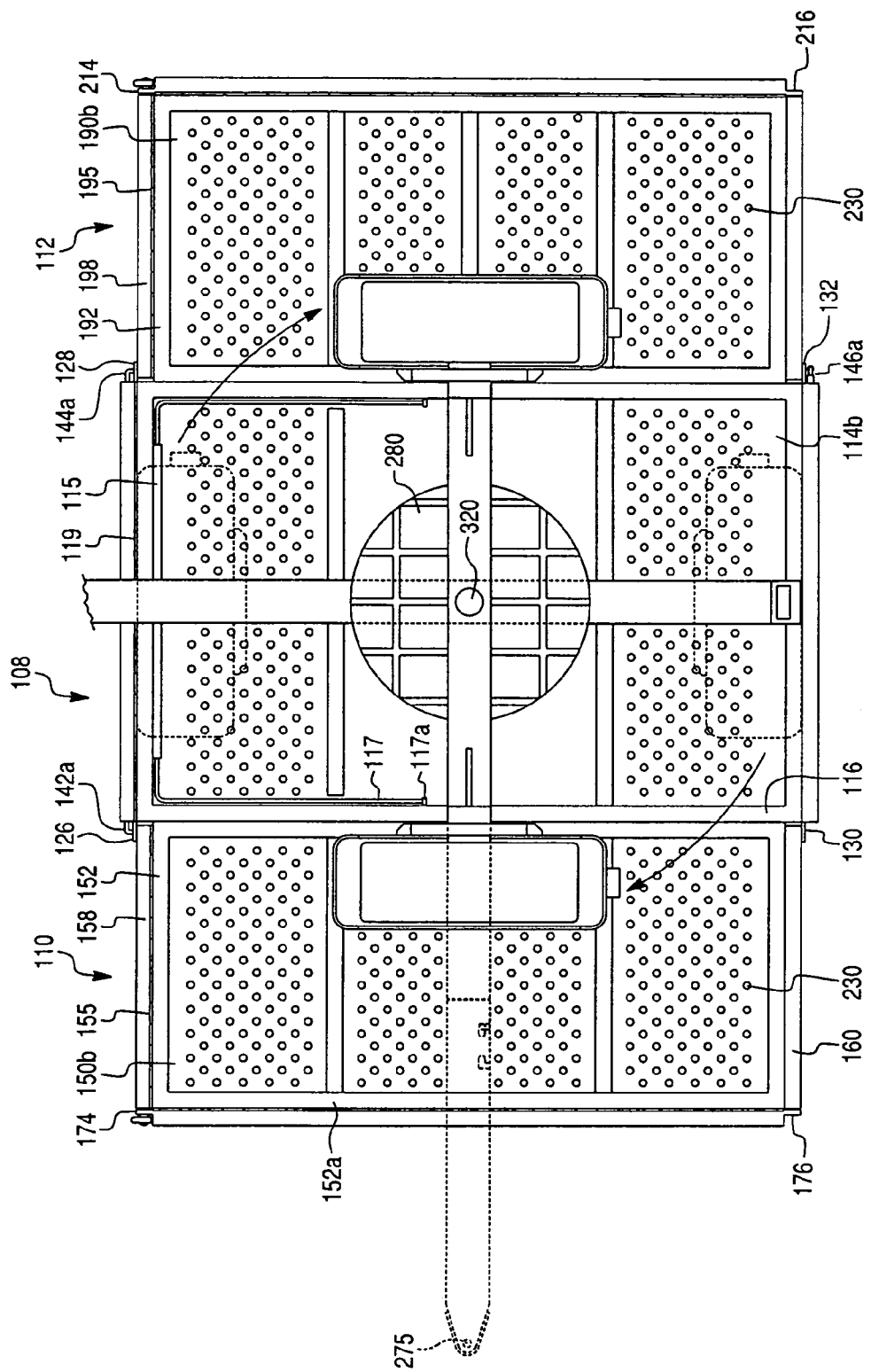
FIG. 4 is a bottom view of the trailer assembly of FIG. 1, depicting a movement of a wheel subassembly and drawbar into transverse positions.

The intermediate section 108 comprises an intermediate platform 114 having an inner surface 114a facing generally upward in FIG. 1 and an outer surface 114b (FIG. 4) facing generally downward and hidden from view in FIG. 1. An intermediate frame structure 116 comprising a plurality of beams (unnumbered) is provided on the outer surface 114b and reinforces the intermediate platform 114. As best shown in FIG. 4, a sleeve 115 is fixedly attached to the outer surface 114b and the intermediate frame structure 116. The sleeve rotatably supports a kickstand 117, which has first and second feet 117a at its respective terminal ends. The kickstand 117 is illustrated in its stowed position in FIG. 4, and in its stabilizing position in FIG. 11.

In the stabilizing position, the first and second feet 117a contact the ground. Situated on opposite sides of the intermediate platform 114 is a right intermediate side panel 118 and a left intermediate side panel 120, which are positionable substantially transversely to the intermediate platform inner surface 114a and are spaced apart from and face one another in the arrangement depicted in FIG. 1. A right intermediate hinge 119 (FIG. 4) rotatably connects the right intermediate side panel 118 to the intermediate platform 114. The left intermediate side panel 120 and the intermediate platform 114 are fixed and retained stationary relative to one another. The right intermediate side panel 118 and the left intermediate side panel 120 have right and left intermediate side frame structures 122 and 124, respectively, for providing reinforcement and structural support. The frame structures 122 and 124 may have a hollow construction. As best shown in FIGS. 1 and 2, the right intermediate side panel 118 comprises outer flanges 126 and 128 situated on opposite ends of the panel 118. Similarly, opposite ends of the left intermediate side panel 120 comprise outer flanges 130 and 132, respectively, as shown in FIG. 3. In the illustrated embodiment, the flanges 126, 128, 130, and 132 each are quadrangles, although other shapes may be selected.

The intermediate section 108 is provided with a first latching mechanism 142, a second latching mechanism 144, and a third latching mechanism 146. The first latching mechanism 142 is coupled to the right intermediate side panel 118, and comprises a lever 142a, a hook-shaped latching terminus 142c, and a connector rod 142b operatively connecting the lever 142a and the latching terminus 142c. The connector rod 142b passes through a hollow portion of the frame structure 122. The second latching mechanism 144 comprises a lever 144a, a hook-shaped latching terminus 144c, and a connector rod 144b operatively connecting the lever 144a and the latching terminus 144c. The connector rod 144b also extends through a hollow portion of the frame structure 122 to secure the second latching mechanism 144 to the side panel 118. The third latching mechanism 146 comprises a lever 146a, twin hook-shaped latching termini 146c, and a connector rod 146b operatively connecting the lever 146a to the latching termini 146c. The connecting rod 146b extends through a hollow portion (not shown) of the frame structure 124. The movements and operations of the latching mechanism 142, 144, and 146 will be described below.

Figure 5:
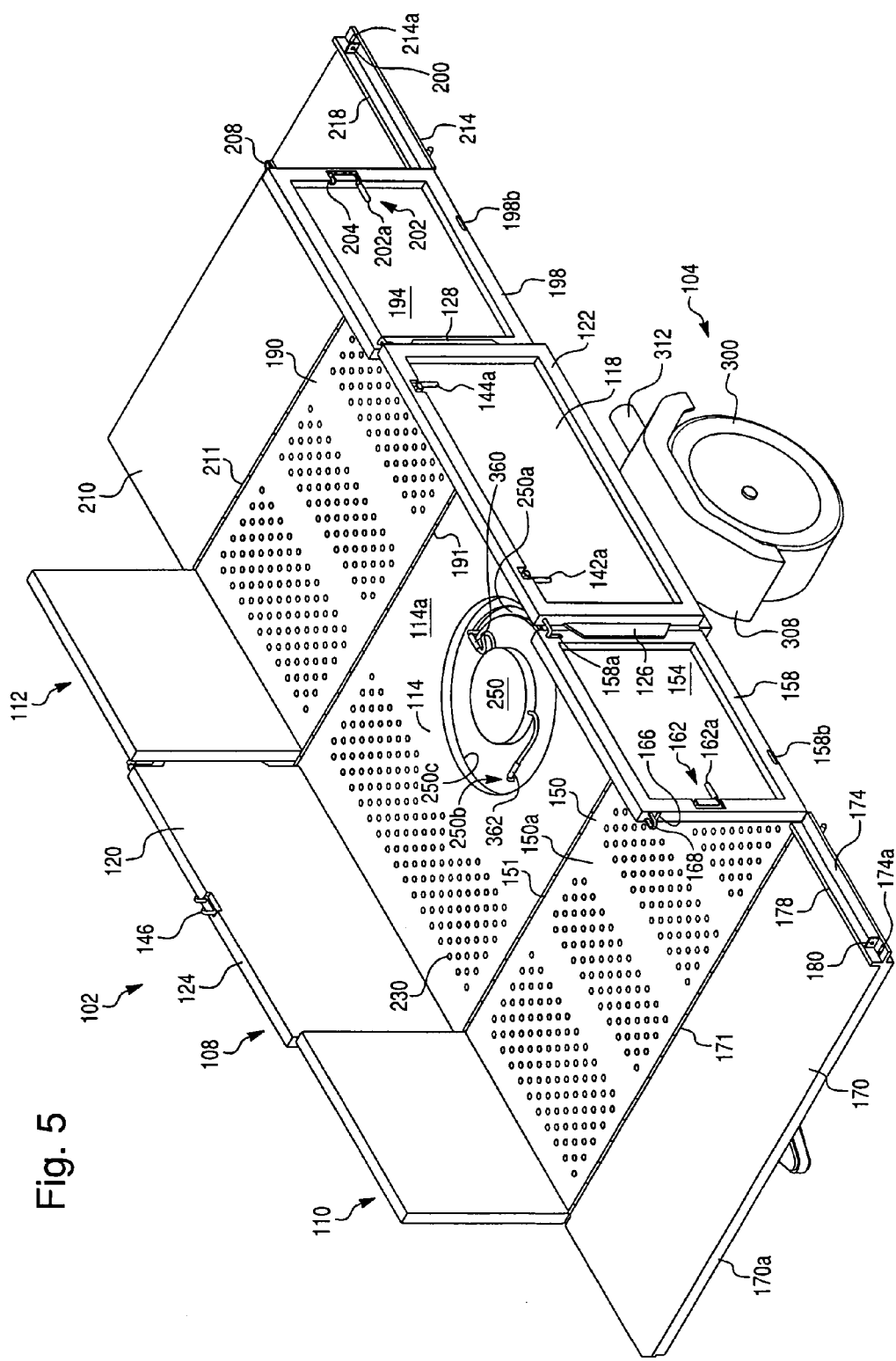
FIG. 5 is a front, upper perspective view of the trailer assembly of FIG. 1, depicting the forward and aft end gates of the bed subassembly in open/down positions.
Figure 7:
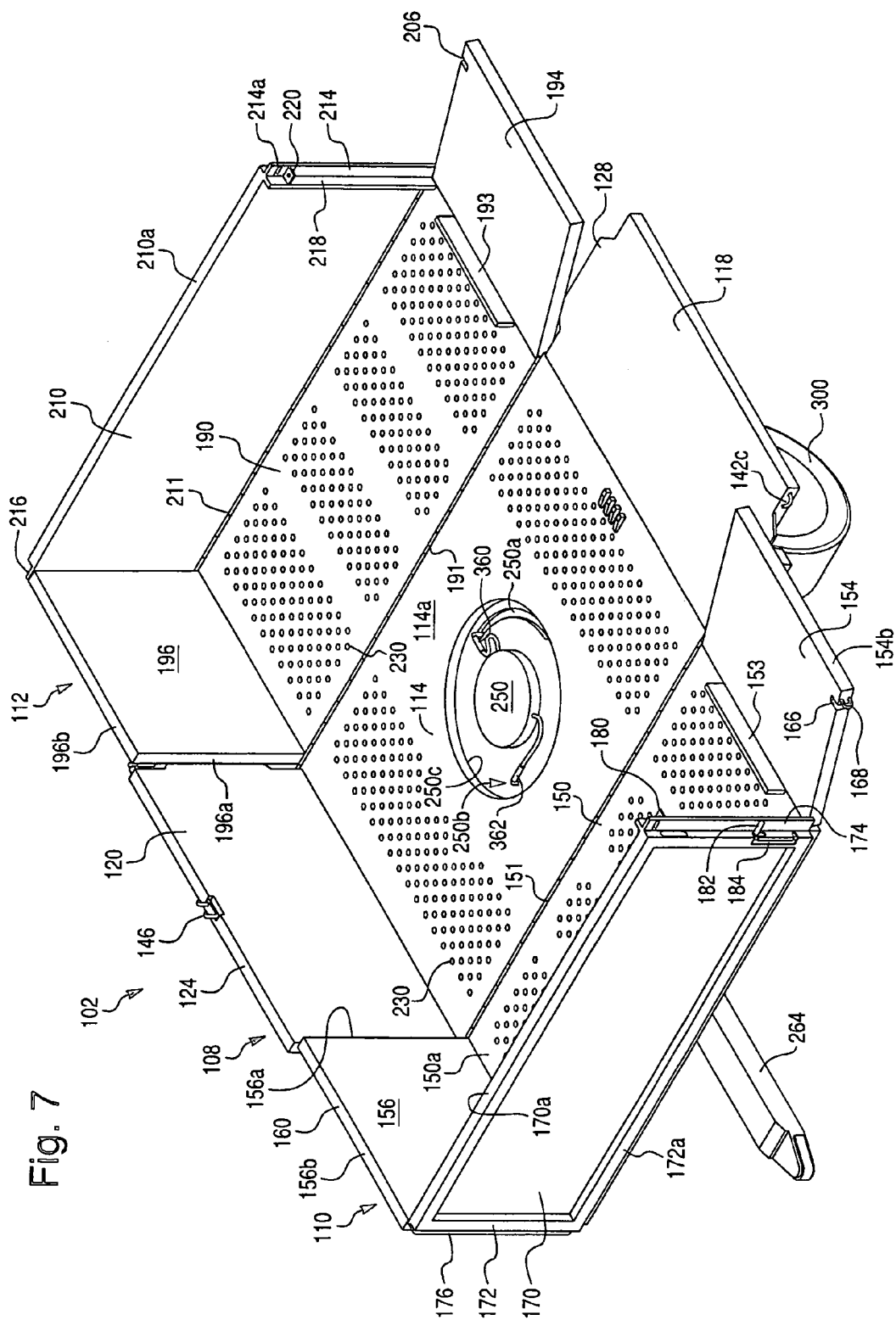
FIG. 7 is a front, upper perspective view of the trailer assembly of FIG. 1, depicting panels of the right side of the bed subassembly in down positions.

The forward section 110 comprises a forward platform 150 having an inner surface 150a facing generally upward in FIG. 1 and an outer surface 150b (FIG. 4) facing generally downward and hidden from view in FIG. 1. As shown in FIGS. 1, 5, and 7, in the extended configuration the inner surfaces 114a and 150a are substantially parallel and substantially coplanar with one another. A forward frame structure 152 comprising a plurality of reinforcing beams is provided on the outer surface 150b. An elongated forward hinge 151 (FIGS. 1, 5, and 7) rotatably connects the forward section 110 to the intermediate section 108 at the interface of the forward platform 150 and the intermediate platform 114. Forward rib 153 (FIG. 7) extends upward from the right edge of the forward platform inner surface 150a.

Situated on opposite sides of the forward platform 150 are a right forward side panel 154 and a left forward side panel 156, which are positionable substantially transversely to the forward platform inner surface 150a and are spaced apart from and face one another in the arrangement depicted in FIG. 1. A right forward hinge 155 (FIG. 4) rotatably connects the right forward side panel 154 to the forward platform 150. Although not shown in FIG. 1, the right forward side panel 154 abuts against the forward rib 153 (FIG. 7) to prevent rotational or pivotal movement of the right forward side panel 154 from the transverse arrangement of FIG. 1 toward the forward platform inner surface 150a. The left forward side panel 156 is stationary relative to and fixed transversely to the forward platform 154. The right forward side panel 154 and the left forward side panel 156 include right and left forward side frame structures 158 and 160, respectively, for providing structural support to the forward section 110. The frame structures 158 and 160 may possess hollow constructions. Referring to FIGS. 2 and 5, the frame structure 158 comprises latch receiving slots 158a and 158b, and a lever channel 164 in which a fourth latching mechanism 162 is movable. The fourth latching mechanism 162 comprises a lever 162a and a latching rod 162b attached to the lever 162a. As shown in FIGS. 5 and 7, the upper portion of the forward edge of the frame structure 158 contains a tang slot 166 and an eyelet 168 situated above the tang slot 166. Turning to FIG. 3, the frame structure 160 includes a latch-receiving slot 160a extending along the upper portion of the frame structure 160. The movements and operations of the fourth latching mechanism 162, the latch-receiving slots 158a, 158b, and 160a, the tang slot 166, and the eyelet 168 will be described in further detail below.

Figure 6:
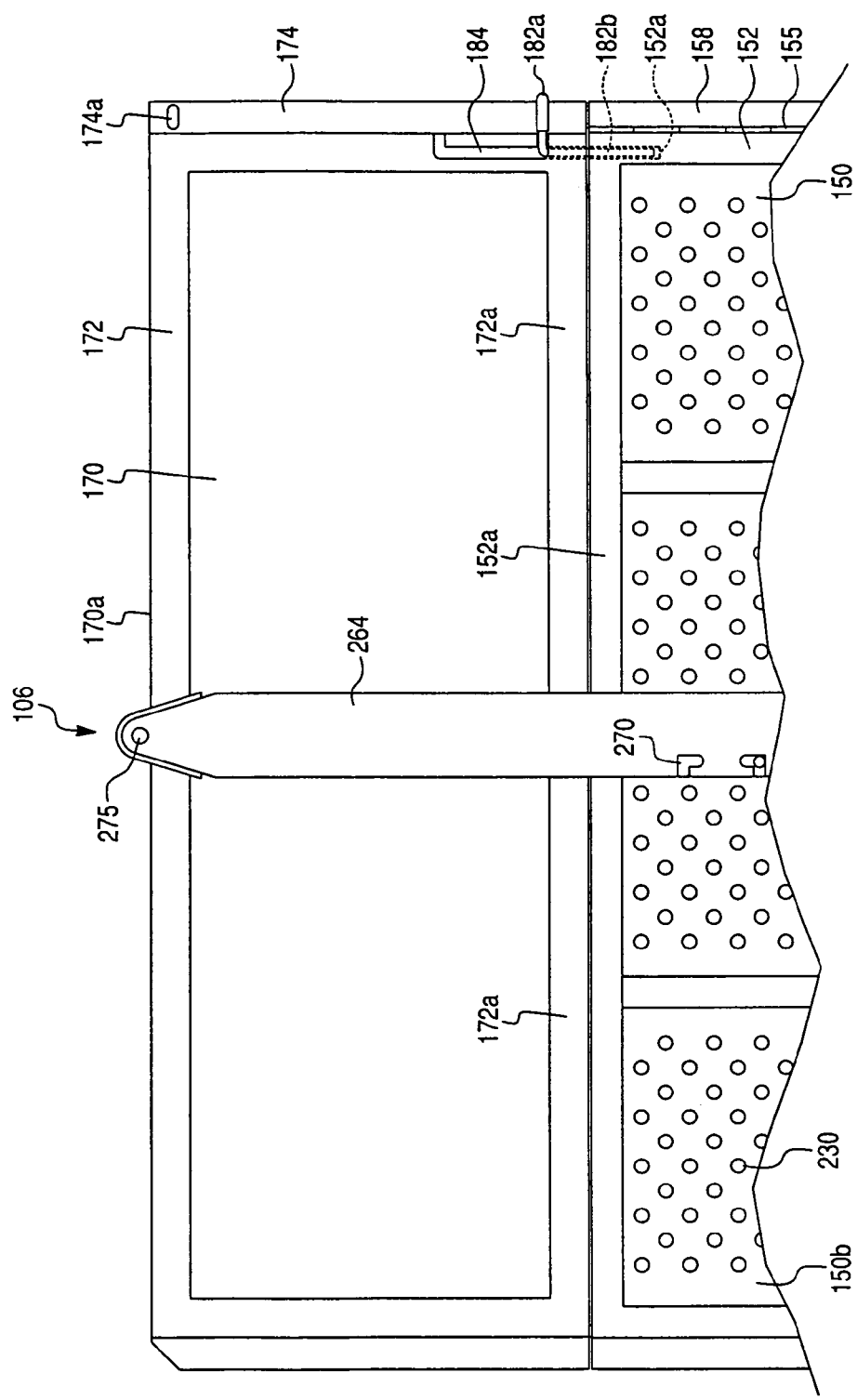
FIG. 6 is an enlarged view of a portion of the bottom of the trailer assembly of FIG. 5, depicting the forward gate in an open/down position.

The forward section 110 further comprises a forward end gate 170 having a reinforcing outer frame structure 172. The forward end gate 170 extends laterally between the right and left forward side panels 154 and 156 in FIG. 1, and has an upper edge 170a distal to the forward platform inner surface 150a. An elongated forward gate hinge 171 (FIG. 5) rotatably connects the forward end gate 170 to the forward platform 150. The forward end gate 170 comprises a right flange 174 and a left flange 176 extending laterally outward from opposite edges of the forward end gate 170. The right flange 174 includes an eyelet-receiving slot 174a (FIG. 5) through which eyelet 168 may be received, as shown in FIG. 1. The forward end gate 170 further comprises an elongated rib 178 (FIG. 5) extending the length of the forward end gate 170 and arranged perpendicular and in close proximity to the right flange 174. Fixed orthogonally between the rib 178 and the right flange 174 is a tang 180 having aperture (unnumbered) with an axis substantially parallel to the rib 178. The outer frame structure 172 has a lever channel 184 in which a fifth latching mechanism 182 is movable. As shown in FIG. 6, the fifth latching mechanism 182 comprises a lever 182a and a latching rod 182b attached to the lever 182a.

The aft section 112 is a substantial mirror image of the forward section 110. As mentioned above and as will become more apparent from the description below, the symmetry of the forward and aft sections 110 and 112 of the illustrated embodiment makes the assignment of the terms "forward" and "aft" in this detailed description somewhat arbitrary. For example, the aft section 112 may be arranged in closer proximity or farther away from the towing vehicle relative to the "forward" section. The aft section 112 comprises an aft platform 190 having an inner surface 190a facing generally upward in FIG. 1 and an outer surface 190b (FIG. 4) facing generally downward and hidden from view in FIG. 1. A reinforcing aft frame structure 192 comprising a plurality of beam abuts the outer surface 190b. An elongated aft hinge 191 (FIGS. 1 and 5) rotatably connects the aft section 112 to the intermediate section 108 at the interface of the aft platform 190 and the intermediate platform 114. Aft rib 193 (FIG. 7) extends upward from the right edge of the aft platform inner surface 190a.

Situated on opposite sides of the forward platform 190 are a right aft side panel 194 and a left aft side panel 196, which are positionable substantially transversely to the aft platform inner surface 190a and are spaced apart from and face one another in the arrangement depicted in FIG. 1. A right aft hinge 195 (FIG. 4) rotatably connects the right aft side panel 194 to the aft platform 190. Although not shown in FIG. 1, the right aft side panel 194 abuts against the aft rib 193 (FIG. 7) to prevent rotational or pivotal movement of the right aft side panel 194 from its transverse position of FIG. 1 toward the aft platform inner surface 190a. The left aft side panel 196 and the aft platform 190 are fixed and retained stationary relative to one another. The right aft side panel 194 and the left aft side panel 196 include right and left aft reinforcing side frame structures 198 and 200, respectively. The frame structures 198 and 200 may possess hollow constructions. Referring to FIG. 2, the right aft reinforcing frame structure 198 comprises latch receiving slots 198a and 198b, and a lever channel 204 in which a sixth latching mechanism 202 is movable. The sixth latching mechanism 202 comprises a lever 202a and a latching rod 202b attached to the lever 202a. The upper portion of the aft edge of the frame structure 198 contains a tang slot 206, and eyelet 208 situated above the tang slot 206. Turning to FIG. 3, frame structure 200 includes a latch-receiving slot 200a extending along the upper portion of the frame structure 200. The movements and operations of the sixth latching mechanism 202, the latch-receiving slots 198a, 198b, and 200a, the tang slot 206, and the eyelet 208 will be described in further detail below.

The aft section 112 further comprises an aft end gate 210 having a reinforcing outer frame structure 212. The aft end gate 210 extends laterally between the right and left aft side panels 194 and 196 in FIG. 1, and has an upper edge 210a distal to the aft platform inner surface 190a. An elongated aft gate hinge 211 (FIG. 5) rotatably connects the aft end gate 210 to the aft platform 190. The aft end gate 210 comprises a right flange 214 and a left flange 216 extending laterally outward from opposite edges of the aft end gate 210. As shown in FIGS. 5 and 7, the right flange 214 includes an eyelet-receiving slot 214a through which eyelet 208 may be received. The aft end gate 210 further comprises an elongated rib 218 extending a substantial length of the aft end gate 210 and arranged perpendicular and in close proximity to the right flange 214. Situated orthogonally between the rib 218 and the right flange 214 is a tang 220 having an aperture (unnumbered) with an axis substantially parallel to the rib 218. The outer frame structure 212 has a lever channel 224

(see FIG. 11) in which a seventh latching mechanism 222 is movable. The seventh latching mechanism 222 comprises a lever 222a and a latching rod (not shown) attached to the lever 222a.

Figure 15:
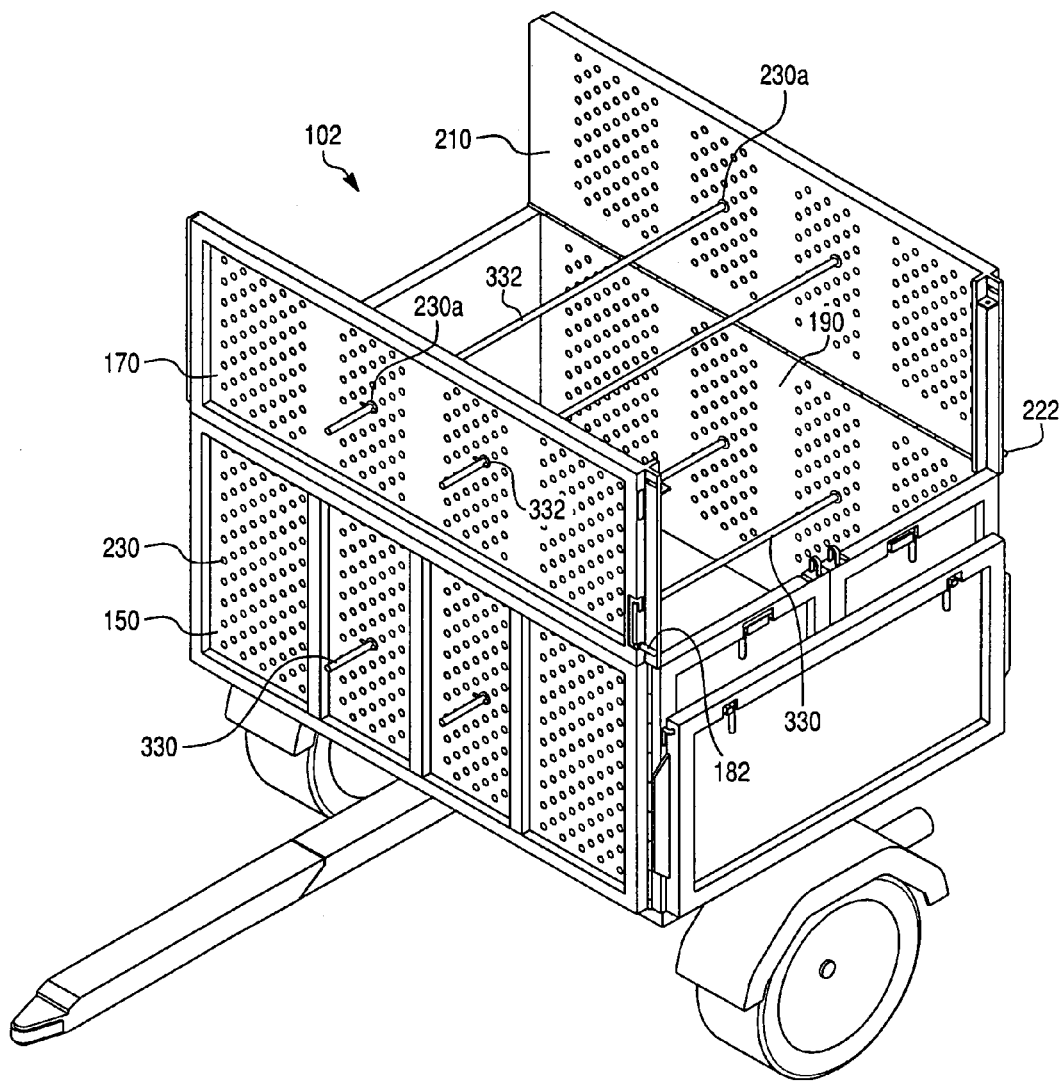
FIG. 15 is a front, upper perspective view of a trailer assembly similar to that of FIG. 1, depicting the trailer assembly in a folded position with open end gates including apertures, wherein stabilizer members extend between the open end gates and support members extend through the compartment and beyond the bed subassembly walls.

Each of the intermediate platform 114, the forward platform 150, and the aft platform 190 includes a respective plurality of apertures 230 extending continuously from their respective inner surfaces (114a, 150a, 190a) to their respective outer surfaces (114b, 150b, 190b). The apertures 230 may be arranged in a grid-like pattern, in which rows and columns of the grids contain multiple apertures arranged linearly relative to one another. In the illustrated embodiment, the aperture rows are in a staggered relationship to each other and obliquely angled. The illustrated apertures 230 are circular in shape, constant in thickness, and substantially identical in size. It should be understood that some or all of the apertures 230 may take different shapes and sizes from one another, and may have a varying thickness. The apertures 230 may also be arranged in other patterns, or randomly. Optionally, the apertures 230 may be eliminated from one or any combination of the intermediate platform 114, the forward platform 150, and the aft platform 190. The apertures 230 may also be placed in side panels or end gates, as shown in FIG. 15. The apertures 230 in the intermediate platform 114 may serve as drainage ports. Other possible functions and uses of the apertures 230 are described in further detail below.

Various configurations and positions of the bed subassembly 102 will now be described in detail. FIG. 1 depicts the bed assembly 102 in an extended configuration, with the side panels 118, 154, and 194 and the end gates 170 and 210 collectively forming a substantially continuous barrier around the perimeter of and substantially transverse to the bed floor. The intermediate platform inner surface 114a is oriented substantially parallel to the ground, and faces upward. The forward and aft platform inner surfaces 150a and 190a are positioned on opposite ends of the intermediate platform inner surface 114a. As shown by the bottom view of FIG. 4, an end beam of the frame structure 116 of the intermediate platform 114 abuts against an end beam of the frame structure 152 of the forward platform 150 to maintain the intermediate platform inner surface 114a in substantially parallel and substantially coplanar relationship with the forward platform inner surface 150a. Similarly, an opposite end beam of the frame structure 116 of the intermediate platform 114 abuts against an end beam of the frame structure 192 of the aft platform 190 to maintain the intermediate platform inner surface 114a in substantially parallel and substantially coplanar relationship with the aft platform inner surface 190a.

Left side panels 120, 156, and 196 are fixed in a stationary manner and transverse to the platform inner surfaces 114a, 150a, and 190a, respectively. The left side panels 120, 156, and 196 are substantially parallel to one another. The left forward side panel 156 and the left aft side panel 196 are substantially coplanar with one another, whereas the left intermediate side panel 120 is parallel, but spaced laterally outward relative to the left forward and aft side panels 156 and 196. On the opposite side of the bed assembly 102, the right forward side panel 154 and the right aft side panel 194 are substantially parallel and substantially coplanar with one another, whereas the right intermediate side panel 118 is parallel, but spaced laterally outward relative to the right forward and aft side panels 154 and 194. As shown in FIGS. 1 and 2, the hook-shaped latching terminus 142c of the first latching mechanism 142 is received in the latch-receiving slot 158a of the right forward side panel 154. The first latching mechanism 142 thereby interlocks the right intermediate side panel 118 and the right forward side panel 154 to one another. This interlocking relationship precludes the forward section 110 from rotating relative to the intermediate section 108 about the elongated forward hinge 151. The hook-shaped latching terminus 144c of the second latching mechanism is received in the latch-receiving slot 198a of the right aft side panel 194, interlocking the right intermediate side panel 118 and the right aft side panel 194 to one another. The interlocking relationship secured by the second latching mechanism 142 precludes the aft section 112 from rotating relative to the intermediate section 108 about the elongated aft hinge 191.

In the configuration illustrated in FIG. 1, the forward end gate 170 extends laterally between the right forward side panel 154 and the left forward side panel 156, and stands substantially transversely to the forward platform inner surface 150a. The right flange 174 abuts flush against the forward beam of the frame structure 158, and the forward rib 178 rests against the inner surface of the right forward side panel 154. The eyelet 168 extends through the eyelet-receiving slot 174a, and the tang 180 is inserted in the tang-receiving slot 166. In FIG. 1 the fourth latching mechanism 162 is shown in a latched position, in which the lever 162a of the fourth latching mechanism 162 is raised to insert the latching rod 162b through the aperture of tang 180. The fourth latching mechanism 162 interlocks the right forward side panel 154 and the forward end gate 170, preventing the forward end gate 170 from rotating about the elongated forward gate hinge 171 and preventing the right forward side panel 154 from rotating about the right forward hinge 155.

At the opposite end of the bed assembly 102, the aft end gate 210 extends laterally between the right aft side panel 194 and the left aft side panel 196, and stands substantially transversely to the aft platform inner surface 190a in the state shown in FIG. 1. The right aft flange 214 abuts flush against the aft beam of the frame structure 198, and the aft rib 218 rests against the inner surface of the right aft side panel 194. The eyelet 208 extends through the eyelet-receiving slot 214a, and the tang 220 is inserted in the tang-receiving slot 206. In FIG. 1 the sixth latching mechanism 202 is shown in a latched position, in which the lever 202a of the sixth latching mechanism 202 is raised to insert the latching rod 202b through the aperture of tang 220. The sixth latching mechanism 202 interlocks the right aft side panel 194 and the aft end gate 210. The interlocking engagement caused by the sixth latching mechanism 202 prevents the aft end gate 210 from rotating about the elongated aft gate hinge 211 and simultaneously prevents the right aft side panel 194 from rotating about the right aft hinge 195.

A detailed explanation of a method for moving the forward and aft end gates 170 and 210 into their respective open positions, while retaining the bed subassembly 102 in an extended configuration, will be described below with reference to FIGS. 5–7. As described above, the fourth latching mechanism 162 is adapted to interlock the forward end gate 170 and the right forward side panel 154 to one another and prevent their rotation about the elongated forward gate hinge 171 and the right forward hinge 155, respectively. In order to disengage the fourth latching mechanism 162, lever 162a is moved along the lever channel 164 as follows (with lever 162a movements described in reference to FIG. 1). The lever 162a, shown in FIG. 1 in a locked position, is rotated forward to unlock the lever 162a. The lever 162a is then slid downward along lever channel 164, which in unison slides the connected latching rod 162b downward and out of engagement with the aperture of tang 180. The lever 162*a* may then be rotated rearward along channel 164 for impeding upward movement of the lever 162*a*. The forward end gate 170 is then rotatable/pivotal forward about the elongated forward gate hinge 171 from its closed position to an open position shown in FIG. 5. Movement of the forward end gate 170 from its closed position to its open position disengages the eyelet 168 from the eyelet-receiving slot 174*a* and removes the tang 180 from the tang-receiving slot 166. The forward end gate 170 is movable forward/downward until coming to rest in substantial parallel and substantially coplanar relationship with the forward platform inner surface 150*a* to define an open position of the forward end gate 170. As best shown in FIG. 6, in the open position beam 152*a* of the frame structure 152 abuts against beam 172*a* of the frame structure 172 to obstruct further downward movement of the forward end gate 170.

The fifth latching mechanism 182 is actuatable to secure the forward end gate 170 into the open position. Referring to FIG. 6, movement of the lever 182*a* along lever channel 184 towards the beam 172*a* causes the latching rod 182*b* to slide in unison into bore 152*a* of the forward frame structure 152. Engagement of the latching rod 182*b* in the bore 152*a* prohibits the front end gate 170 from rotating/pivoting about the elongated forward gate hinge 171 relative to the forward platform inner surface 150*a*.

The aft end gate 210 is similarly movable about elongated aft gate hinge 211 from the closed position depicted in FIG. 1 to the open position depicted in FIG. 5. Downward movement of lever 202*a* of the sixth latching mechanism 202 along lever channel 204 disengages latching rod 202*b* from the aperture of the tang 220, permitting the aft end gate 210 to rotate/pivot downward about hinge 211 until coming to rest substantially parallel and substantially coplanar with the aft platform inner surface 190*a*. The lever 222*a* of the seventh latching mechanism 222 (FIG. 11) is slidable along lever channel 224 to translate the latching rod (not shown) of the seventh latching mechanism 222 into a bore (not shown) of the aft frame structure 192 (much in the same manner described above in connection with latching mechanism 182 and bore 152*a*). Engagement of the latching rod of the seventh latching mechanism 222 in the bore of the aft frame structure 192 locks the aft end gate 210 in the open position, prohibiting rotational/pivotal movement of the aft end gate 210 about the elongated aft gate hinge 211.

As shown in FIG. 7, the right intermediate side panel 118, the right front side panel 154, and the right aft side panel 194 are movable independently or in unison about hinges 119, 155, and 195. For example, rotational movement of the right intermediate side panel 118 about the right intermediate hinge 119 and independently of forward and aft side panels 154 and 194 is performed as follows. The first latching mechanism 142 and the second latching mechanism 144 are placed in their respective unlatched states by rotating the levers 142*a* and 144*a* upward from the positions shown in FIG. 1. The upward rotation of levers 142*a* and 144*a* pivots the hooked-shaped latching termini 142*c* and 144*c* from the latch-receiving slots 158*a* and 198*a*. (The levers 142*a* and 144*a* may then be moved toward one another along their respective lever slots 122*a* and 122*b*.) The right intermediate side panel 118 is then rotatable about the right intermediate hinge 119 into an open position shown in FIG. 7, in which the right intermediate side panel 118 is substantially parallel and substantially coplanar with the intermediate platform inner surface 114*a*. Although not shown in the drawings, another latching mechanism (similar to fifth latching mechanism 182) may optionally be provided to secure the intermediate platform inner surface 114*a* in its open position.

Rotational movement of the right front side panel 154 about hinge 155 is accomplished as follows. The fourth latching mechanism 162 is positioned into its unlatched state in the manner described above, and the forward end gate 170 is rotated about the elongated forward gate hinge 171 a sufficient distance to disengage the eyelet 168 from the eyelet-receiving slot 174*a* and separate the tang 180 from the tang-receiving slot 166. The right forward side panel 154 is then freely rotatable about hinge 155 from the closed position illustrated in FIG. 1 to the open position illustrated in FIG. 7. As shown in FIG. 7, the flange 126 obstructs the right forward side panel 154 from rotating into parallel and coplanar relationship to the forward platform inner surface 150*a*. If desired, however, the flange 126 may be omitted from the bed subassembly 102 to permit further rotation of the right forward side panel 154 into parallel and coplanar relationship with the forward platform inner surface 150*a*.

The right aft side panel 194 is rotated about hinge 195 in substantially the same manner described above with regard to right front side panel 154. The sixth latching mechanism 202 is unlatched to permit the aft end gate 210 to rotate a sufficient distance to disengage the eyelet 208 from the eyelet-receiving slot 214*a* and to separate the tang 220 from the tang-receiving slot 206. The right aft side panel 194 is then freely rotatable about the elongated aft gate hinge 195 from the closed position illustrated in FIG. 1 to the open position illustrated in FIG. 7. The flange 128 acts an obstruction to the rotational movement of the right aft side panel 194 (in the manner noted above with regard to flange 126 and side panel 154), and may be omitted.

The folded configuration of the bed subassembly 102 and movement of the bed subassembly from the extended configuration to the folded configuration will be described below with additional reference to FIGS. 8–11. The first and second latching mechanisms 142 and 144 are placed in their respective unlatched states by rotating the levers 142*a* and 144*a* upward from the positions shown in FIG. 1, thereby pivoting the hooked-shaped latching termini 142*c* and 144*c* from the latch-receiving slots 158*a* and 198*a*. The forward section 110 is rotated about forward elongated hinge 151 by lifting the forward end portion of the forward platform 150 to slide right and left forward side panels 154 and 156 laterally inward of the right and left intermediate side panels 118 and 120. Rotational movement of the forward section 110 is concluded when edges 154*a* and 156*a* of right and left forward side panels 154 and 156 abut against and rest on the intermediate platform inner surface 114*a*. The aft section 112 is similarly rotated about aft elongated hinge 191 by lifting the aft end portion of the aft platform 190 to slide the right and left aft side panels 194 and 196 laterally inward of the right and left intermediate side panels 118 and 120. Rotational movement of the aft section 112 is concluded when edges 194*a* and 196*a* of right and left aft side panels 194 and 196 abut against and rest on the intermediate platform inner surface 114*a*.

Figure 9:
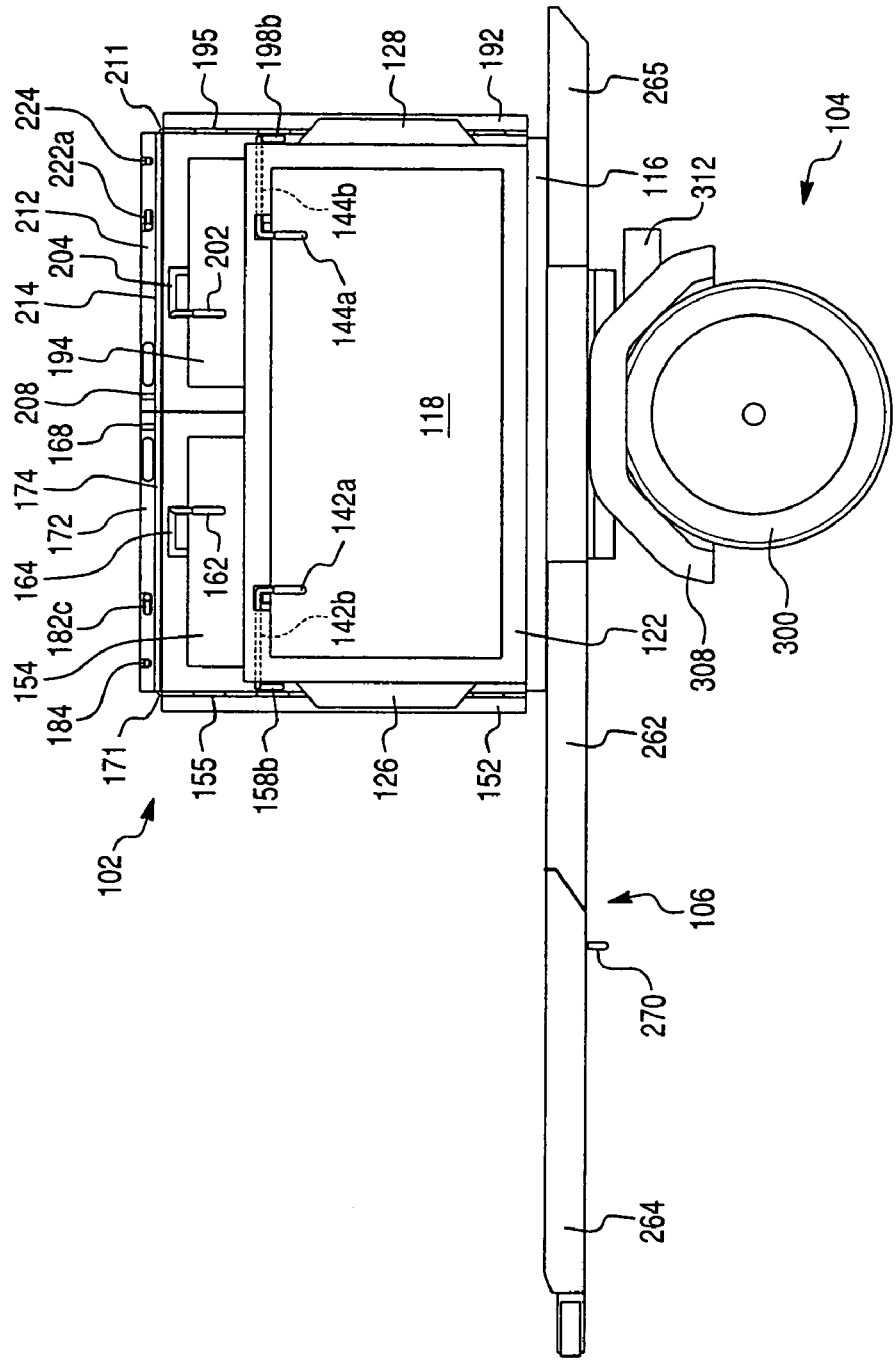
FIG. 9 is a side view of the trailer assembly of FIG. 1 in a folded configuration with closed forward and aft end gates, in which the bed subassembly is rotated 90 degrees counterclockwise relative to the wheel subassembly and the drawbar.
Figure 10:
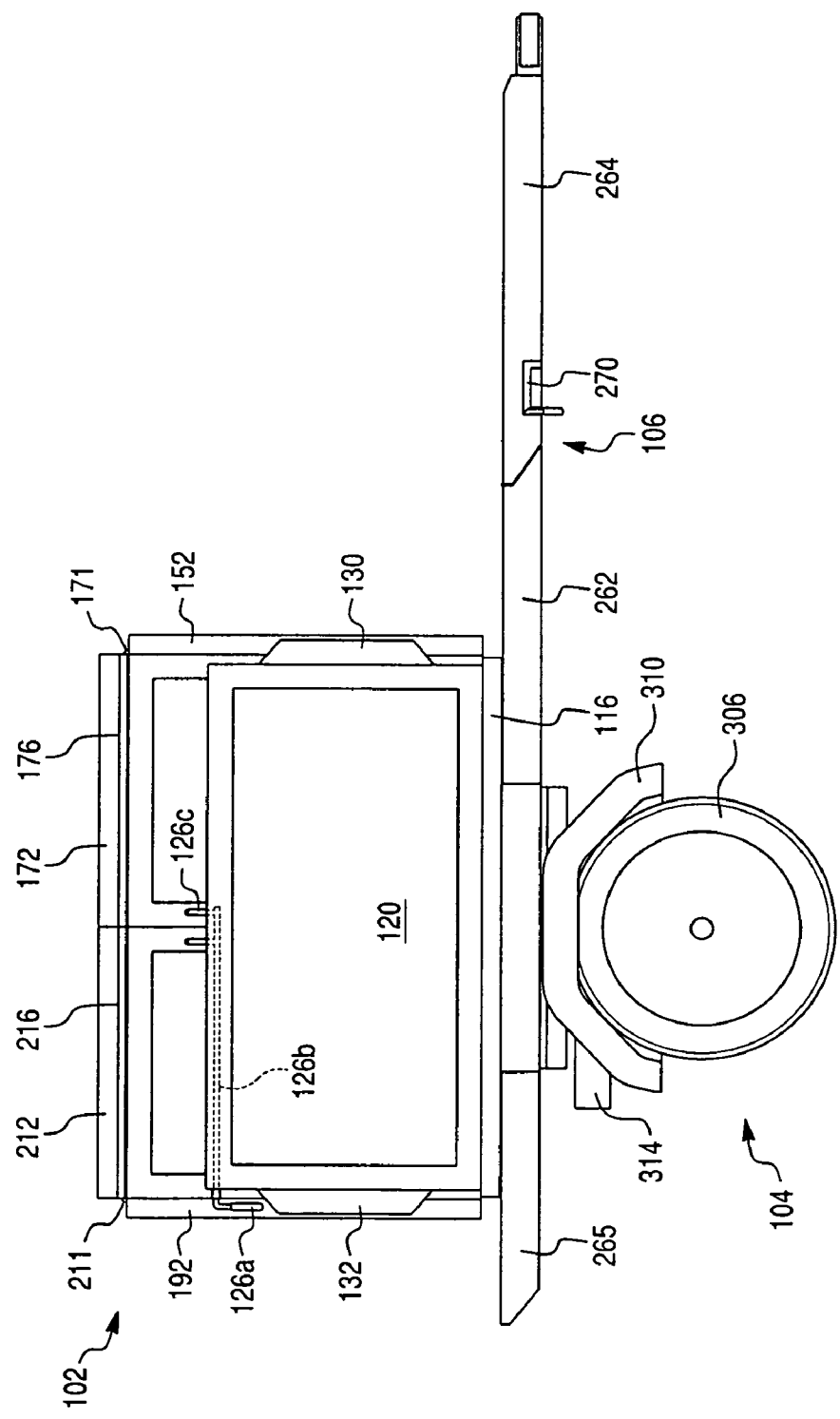
FIG. 10 is a side view of the trailer assembly of FIG. 1 in a folded configuration with closed forward and aft end gates, in which the bed subassembly is rotated 90 degrees clockwise relative to the wheel subassembly and the drawbar.
Figure 11:
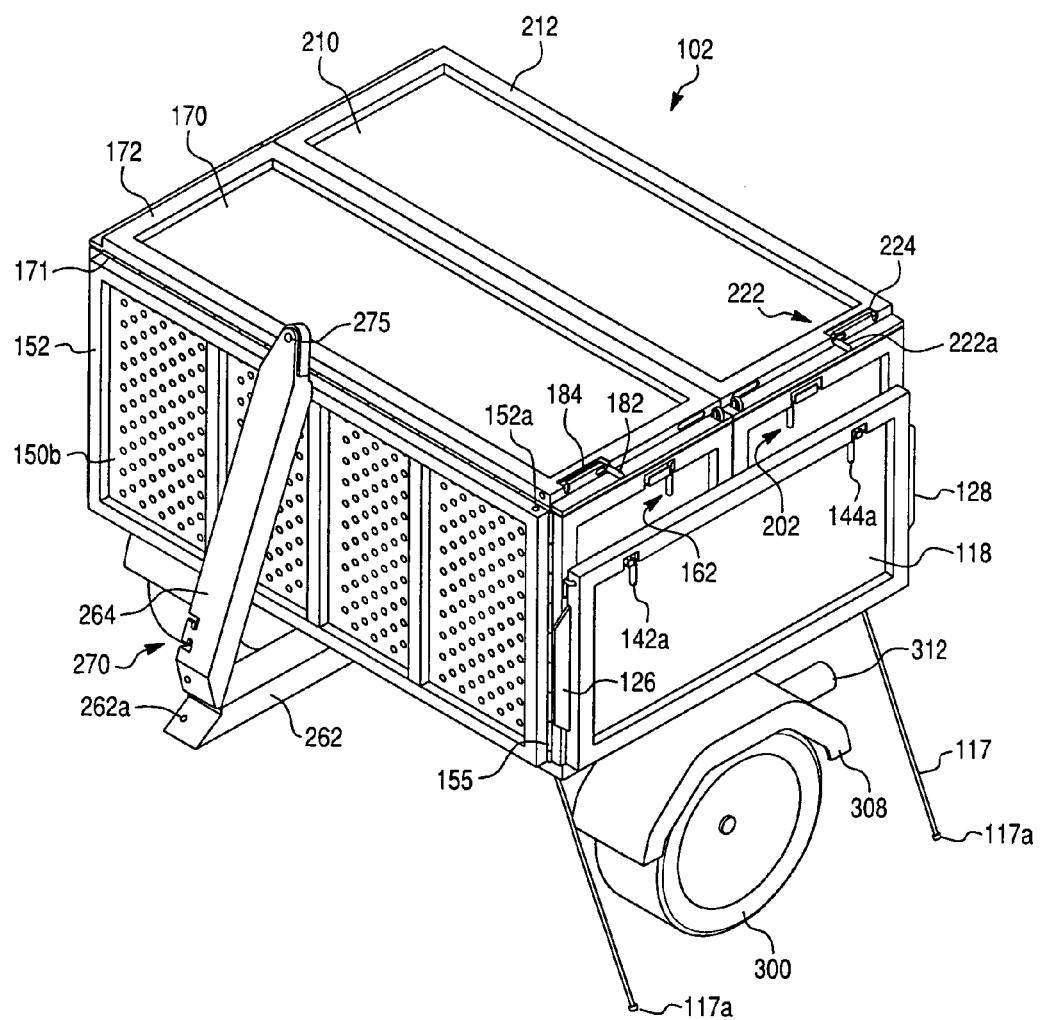
FIG. 11 is a perspective view of the trailer assembly of FIG. 1 in a fully compacted and stowed position.

In the folded position illustrated in FIGS. 9 to 11, the intermediate, forward, and aft sections 108, 110, and 112 collectively form a compartment. In particular, the intermediate platform inner surface 114*a* defines a bottom surface of the compartment. The forward and aft platform inner surfaces 150*a* and 190*a* face one another and are in substantially transverse relationship to the intermediate platform inner surface 114*a* to define end wall surfaces of the compartment. The right forward side panel 154 and the right aft side panel 194 define the right side wall surface of the compartment, and have their respective edges 154b and 194b in abutting relationship with one another. The left forward side panel 156 and the left aft side panel 196 define the left sidewall surface of the compartment, and have their respective edges 156b and 196b in abutting relationship with one another. The forward and aft end gates 170 and 210 are shown in their respective closed positions in FIGS. 9 to 11. The closed forward and aft end gates 170 and 210 are substantially parallel and coplanar with one another, and are spaced apart from and face non-overlapping portions of the intermediate platform inner surface 114a to define a roof structure of the enclosed compartment. In the illustrated embodiment, the respective upper edges 170a and 210a of the forward and aft end gates 170 and 210 are in abutting relationship for sealing the enclosed compartment.

Advantageously, the bed subassembly 102 of the illustrated embodiment is folded in a manner that optimizes the enclosed compartment volume. The intermediate platform inner surface 114a has a first length extending from the front end portion adjacent hinge 151 to the rear end portion adjacent hinge 191. The forward end gate 170 has a second length extending from its proximal edge adjacent hinge 171 to the upper edge 170a of the forward end gate 170. The aft end gate 210 has a third length extending from its proximal edge adjacent hinge 211 to the upper edge 210a of the aft end gate 210. The first length is approximately equal to the sum of the second length and the third length.

Turning to FIGS. 9 and 10, the bed subassembly 102 is securable in the folded configuration (for preventing return of the bed subassembly 102 into the extended configuration) as follows. Upon rotation of the forward and aft sections 110 and 112 about hinges 151 and 191, respectively, the first and second latching mechanisms 142 and 144 will be in their respective unlatched positions. Rotation of the levers 142a and 144a about connector rods 142b and 144b rotates the hook-shaped latching termini 142c and 144c into the latch-receiving slots 158b and 198b, respectively. In this manner, the first latching mechanism 142 latches the right intermediate side panel 118 to the right forward side panel 154 to prevent rotational movement of the forward section 110 relative to the intermediate section 108 about the elongated forward hinge 151. Additionally, the second latching mechanism 144 latches the right intermediate side panel 118 to the right aft side panel 194 to prevent rotational movement of the aft section 112 relative to the intermediate section 108 about the elongated aft hinge 191. The latching mechanisms 142 and 144 also prevent the right intermediate side panel 118 from rotating about right intermediate hinge 119. On the opposite side of the bed assembly shown in FIG. 10, the lever 146a of the third latching mechanism 146 is rotated about connector rod 146b to pivot the hook shaped latching termini 146c into latch-receiving slots 160a and 200a. The hook-shaped latching termini 146c secure the left intermediate panel 120 to the left forward and aft side panels 156 and 196 to prevent the forward and aft sections 110 and 112 from rotating about the forward and aft elongated hinges 151 and 191 into their extended positions.

Figure 8:
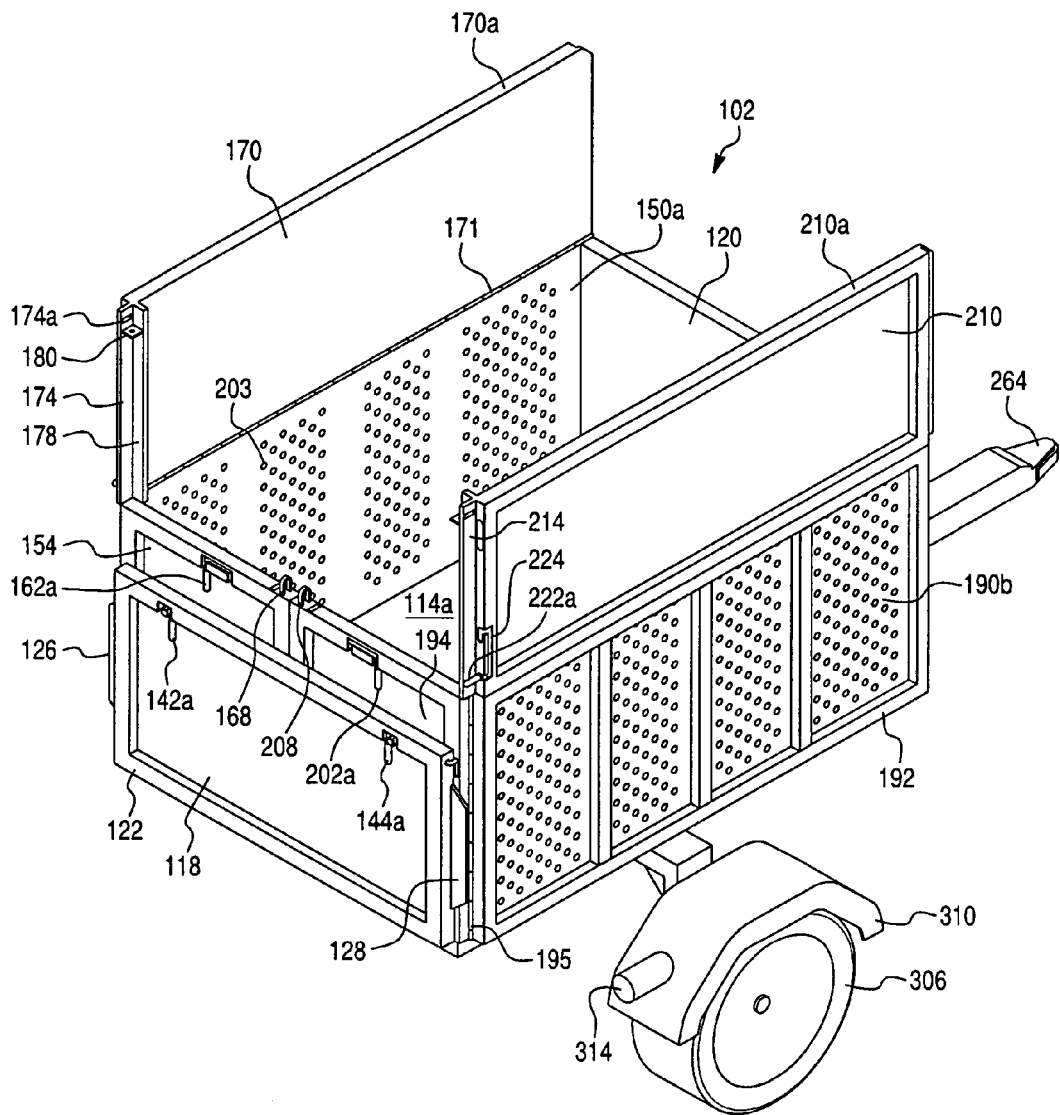
FIG. 8 is a rear, upper perspective view of the trailer assembly of FIG. 1 in a folded configuration with open forward and aft end gates, in which the bed subassembly is rotated 90 degrees relative to the wheel subassembly and the drawbar.

FIG. 8 illustrates the bed subassembly 102 in the folded configuration with forward and aft end gates 170 and 210 in an open position. The transition of the forward and aft end gates 170 and 210 from the closed position of FIGS. 9 and 10 to the open position of FIG. 8 will now be described in detail. The bed subassembly 102 is shown rotated 90 degrees in FIG. 8 relative to FIGS. 9 and 10. The fourth and sixth latching mechanisms 162 and 202 are placed in their respective unlatched positions in the manner described above to disengage the latching rods 162b and 202b from the tangs 180 and 220, respectively. The forward end gate 170 is then rotatable about the elongated forward gate hinge 171 into an open position, in which the forward end gate 170 is substantially parallel and substantially coplanar with the forward platform inner surface 150a. The aft end gate 210 is rotatable about the elongated aft gate hinge 211 into its open position, in which the aft end gate 210 is substantially parallel and substantially coplanar with the aft platform inner surface 190a. The bed compartment is accessible through either or both of the forward and aft end gates 170 and 210. The forward and aft end gates 170 and 210 thereby serve as access doors for selectively permitting access to and sealing of the enclosed compartment. While the forward end gate 170 is in its open position, fifth latching mechanism 182 may be moved to translate the latching rod 182b into bore 152a of the forward frame structure 152 (see FIG. 6). Similarly, while the aft end gate 210 is in its open position, the lever 222a of the seventh latching mechanism 222 is movable downward to translate the latching rod 222b into bore of the rear frame structure 192 to lock the aft end gate 210 into its open position.

The access door of an embodiment of the invention may comprise the forward end gate 170 and/or the aft end gate 210, as described above and illustrated in FIG. 8. According to another embodiment of the invention, the access door may comprise one or more members selected from the group of the right intermediate side panel 118, the right forward side panel 154, and the right aft side panel 194. For example, starting from the reference point shown in FIG. 8, the bed compartment is accessed by placing the first and second latching mechanism 142 and 144 in their unlatched positions, and rotating the right intermediate side panel 118 downward to extend substantially parallel and coplanar to the immediate platform inner surface 114a. The right forward side panel 154 and/or the right aft side panel 194 are then rotatable about their respective hinges 155 and 195 to create an access opening to the compartment. The trailer assembly 100 is rotatable about the axles of the wheel subassembly 104 until the upper edge 170a of the forward end gate 170 contacts the ground, permitting the forward end gate 170 to function as a ramp for loading items into the compartment.

Although not shown, a lock may be placed through eyelets 168 and 208 of the bed subassembly 102 in the configuration and arrangement of FIGS. 9 to 11 for guarding against unauthorized access of the enclosed and sealed compartment. Suitable locks that may be used with the eyelets 168 and 208 include combination and key locks. Placement of the lock through eyelets 168 and 208 prevents the forward and aft end gates 170 and 210 from pivoting about the forward and aft gate hinges 171 and 211 into their respective open positions, and further prevents rotation of the forward section 110 and the aft section 112 about their respective hinges 151 and 191 into the extended configuration.

The bed subassembly 102 further comprises many additional features and accessories not previously discussed or fully elaborated upon. For example, as shown in FIG. 15 the apertures 230 of the forward platform 150 and the aft platform 190 may be situated directly opposite one another to permit at least one support member 330, such as a pole, to extend horizontally from forward platform 150 to the aft platform 190. Support members such as 330 may be used in the compartment to cradle, hold, or otherwise stabilize goods and items, such as dry wall sheets. The support members 330 may extend through the apertures 230 and beyond the outer surface 150b and 190b to permit items (e.g., bikes) to be suspended from the portions of the support members 330 outside the compartment.

As further shown in FIG. 15, the forward and aft end gates 170 and 210 may include apertures 230a opposing one another. In the open gate position shown in FIG. 15, the stabilizing members 332 may extend between the open end gates 170 and 210 to retain the gates 170 and 210 in their open positions and alleviate strain on the latching mechanisms 182 and 222. The support members 330/332 may be retained in place to prevent axial sliding movement by use of suitable fasteners or braces, e.g., pins (unnumbered) inserted diametrically through the support member 332 at the inner or outer face of the end gates 170 and 210. On the other hand, in the closed gate position the apertured end gates 170 and 210 would have their apertures 230a opposing the intermediate platform 114, which optionally may include opposing apertures (not shown). One or more vertical support members or poles (not shown) may extend vertically within the compartment and through the apertures 230 for mounting items (e.g., bikes, kayaks) on the roof of the closed bed subassembly 102.

Figure 14:
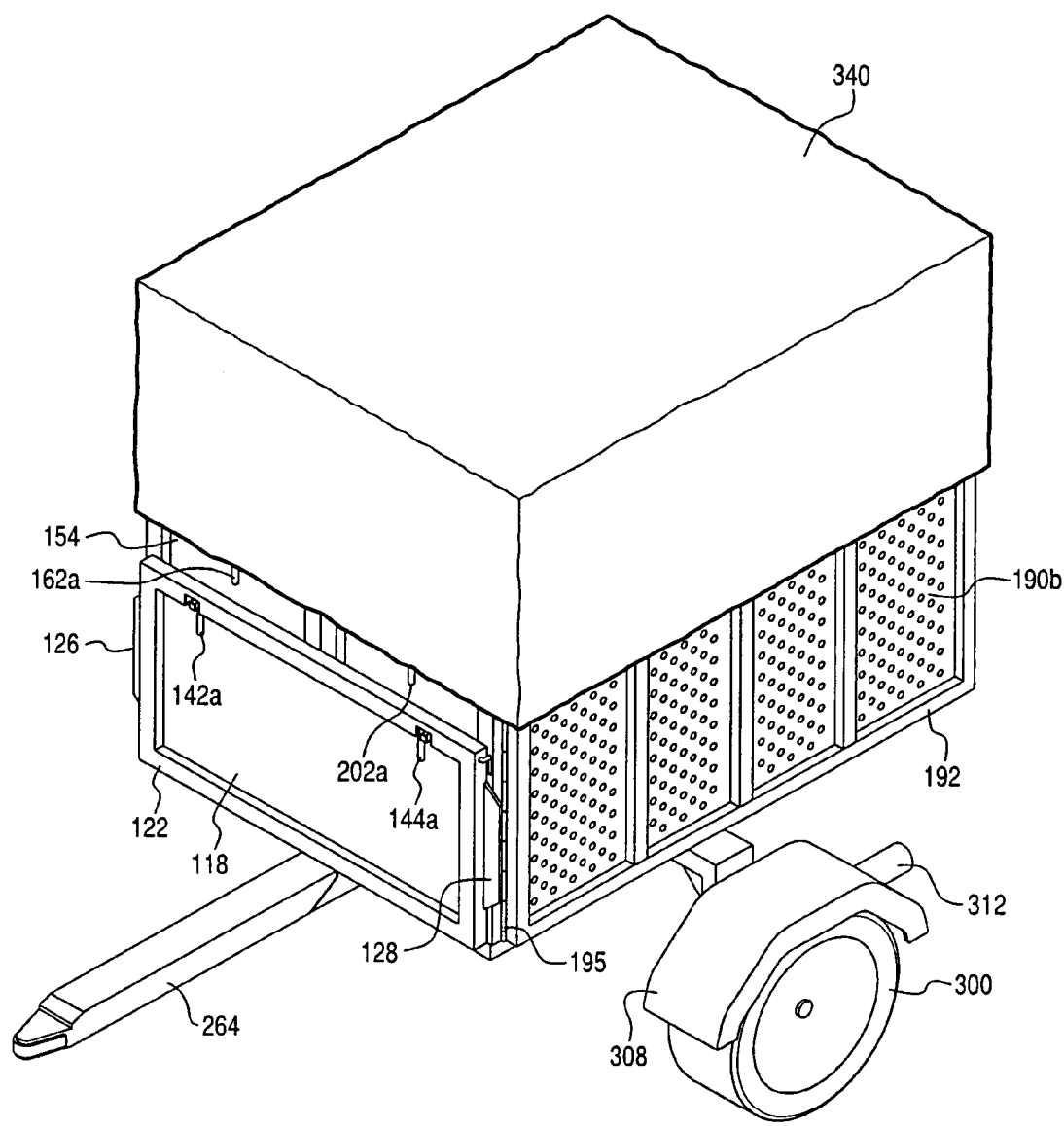
FIG. 14 is a front, upper perspective view of the trailer assembly of FIG. 8, in which a cover is placed over the open end gates to conceal the compartment.

The apertures 230 may also be used for mounting brackets to the bed subassembly 102 to permit mounting of items inside and/or outside of the enclosed compartment. For example, a rack (such as for a bike, boat (kayak), etc.) may be mounted to the outer surfaces 150b and 190b of the right and left intermediate side panels 150 and 190. Apertures may also be formed in the forward and aft end gates 170 and 210 for mounting a rack on the top of the folded and closed bed subassembly 102. According to another embodiment of the invention, the bed subassembly 102 may further comprise a bed liner (not shown) covering one or more of inner surfaces 114a, 150a, and 190a. Clips or other fastening means may extend through the apertures 230 for retaining the bed liner against the inner surfaces. According to still another embodiment of the invention, the bed subassembly 102 may further comprise a cover 340, as shown in FIG. 14. For example, in the open-gate folded configuration of FIG. 14, the cover 340 might extend between upper edges 170a and 210a and, optionally, between the side edges of opposite end gates 170 and 210 to substantially enlarge the capacity of the compartment.

The wheel subassembly 104 and drawbar 106 and their respective relationships to each other and to the bed subassembly 102 will now be discussed in further detail. A circular platform mount 250 extends through and optionally is integrally formed with the intermediate platform 150. The bottom surface of the circular platform mount 250 protrudes downward below the intermediate platform outer surface 114b as a circular disc having circumference 250c. The platform mount 250 includes a central aperture (not shown), discussed in further detail below. The platform mount 250 further includes an arcuate slot 250a spaced radially inward and uniformly spaced apart from the outer circumference of the platform mount 250. The arcuate slot 250a extends continuously approximately 90 degrees about the circular platform mount 250. The platform mount 250 further comprises a radial aperture 250b diametrically opposed from a center portion of the slot 250a.

A cup-shaped drawbar mount 252 is positioned below the platform mount 250. The drawbar mount 252 comprises an inner, circular planar portion 254 having an upper surface 256 and a lower surface 258. A central aperture 254a and first and second radial apertures 255a and 255b extend axial in direction from the upper surface 256 to the lower surface 258 of the drawbar mount 252. A third radial aperture 255c is exposed at upper surface 256, but optionally may not be exposed at the lower surface 258. The lower surface 258 includes a central recess 258a communicating with the central aperture 254a. The drawbar mount 252 further comprises a substantially annular perimeter wall 260 extending continuously around a substantial portion of the upper surface 256 of the planar portion 254, and terminating at spaced regions to define a small radial openings 260a and 260b through which the drawbar 106 extends. The outer circumference of the platform mount 250 is concentrically received in the perimeter wall 260. Sufficient spacing is provided between the outer circumference of the platform mount 250 and the perimeter wall 260 to permit free rotation of the drawbar mount 252 relative to the platform mount 250. A bearing arrangement (not shown) optionally may be included to promote rotational movement of the drawbar mount 252 relative to the platform mount 250.

The drawbar 106 comprises a first drawbar portion 262, a second drawbar portion 264, and a third drawbar portion 265. The first and third drawbar portions 262 and 265 extend radially through openings 260a and 260b of the perimeter wall 260, and are substantially collinear. The first drawbar portion 262 has a proximal end capped with a rotatable gear 268 facing the recess 258a. The first drawbar portion 262 has an opposite (distal) end provided with an aperture 262a. The second drawbar portion 264 is articulately connected to the first drawbar portion 264 at interface 266 and is pivotal about the articulated joint between a pulling state shown in FIG. 1 and a stowed state shown in FIG. 11.

In the pulling state, the first and second drawbar portions 262 and 264 are substantially collinear with one another (and with the third drawbar portion 265). An eighth latching mechanism 270 is provided at the articulated end of the second drawbar portion 264. In the pulling state, a latching portion of the eighth latching mechanism 270 is received in the aperture 262a (FIG. 11) of the first drawbar portion 262 to lock the second drawbar portion 264 in substantially collinear relationship with the first drawbar portion 262. The opposite end of the second drawbar portion 264 comprises a hitch hole 275 for permitting coupling of the drawbar 106 to a pulling means. Suitable pulling means include, for example, vehicles, such as automobiles, motorcycles, vans, SUVs, trucks, tractors, and the like, as well as non-motorized or manual modes.

Figure 12:
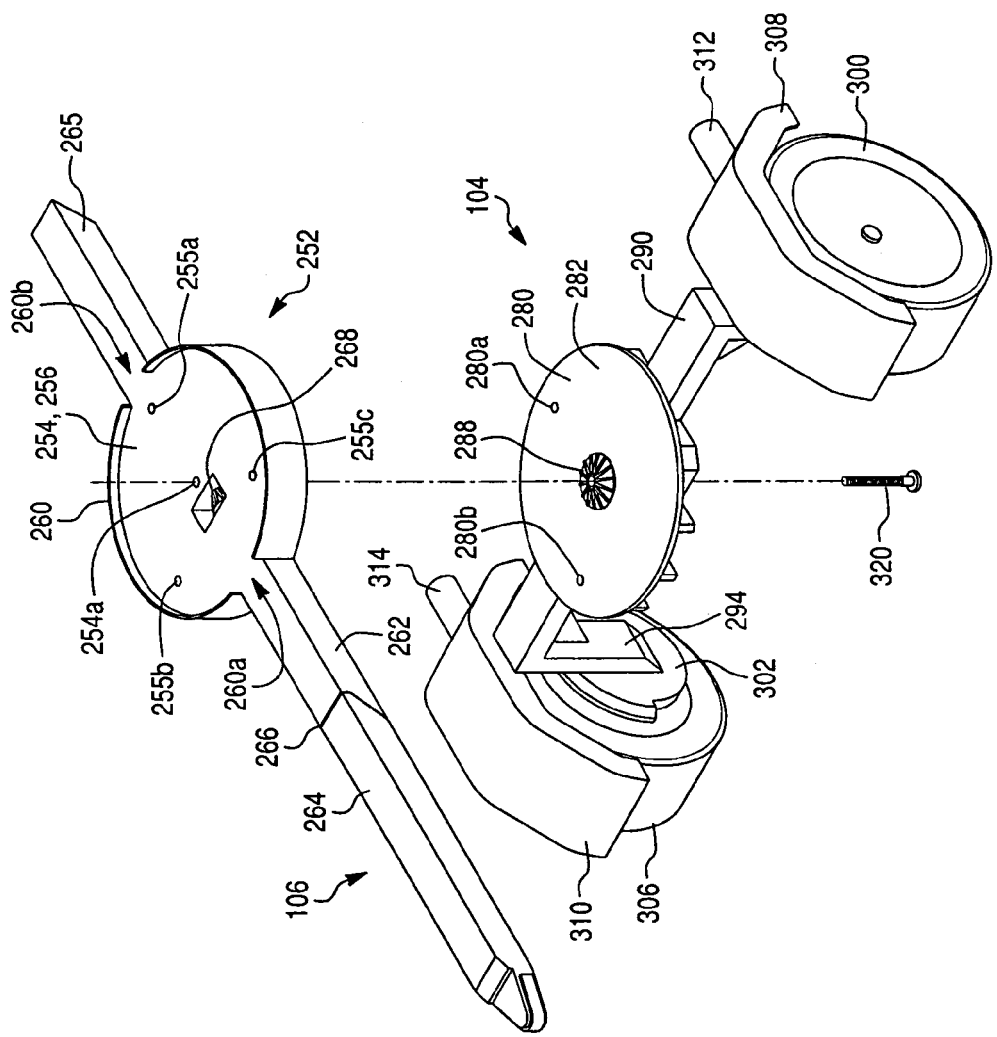
FIG. 12 is an exploded, upper perspective view of the wheel subassembly, drawbar, and related components of the embodiment of FIG. 1.
Figure 13:
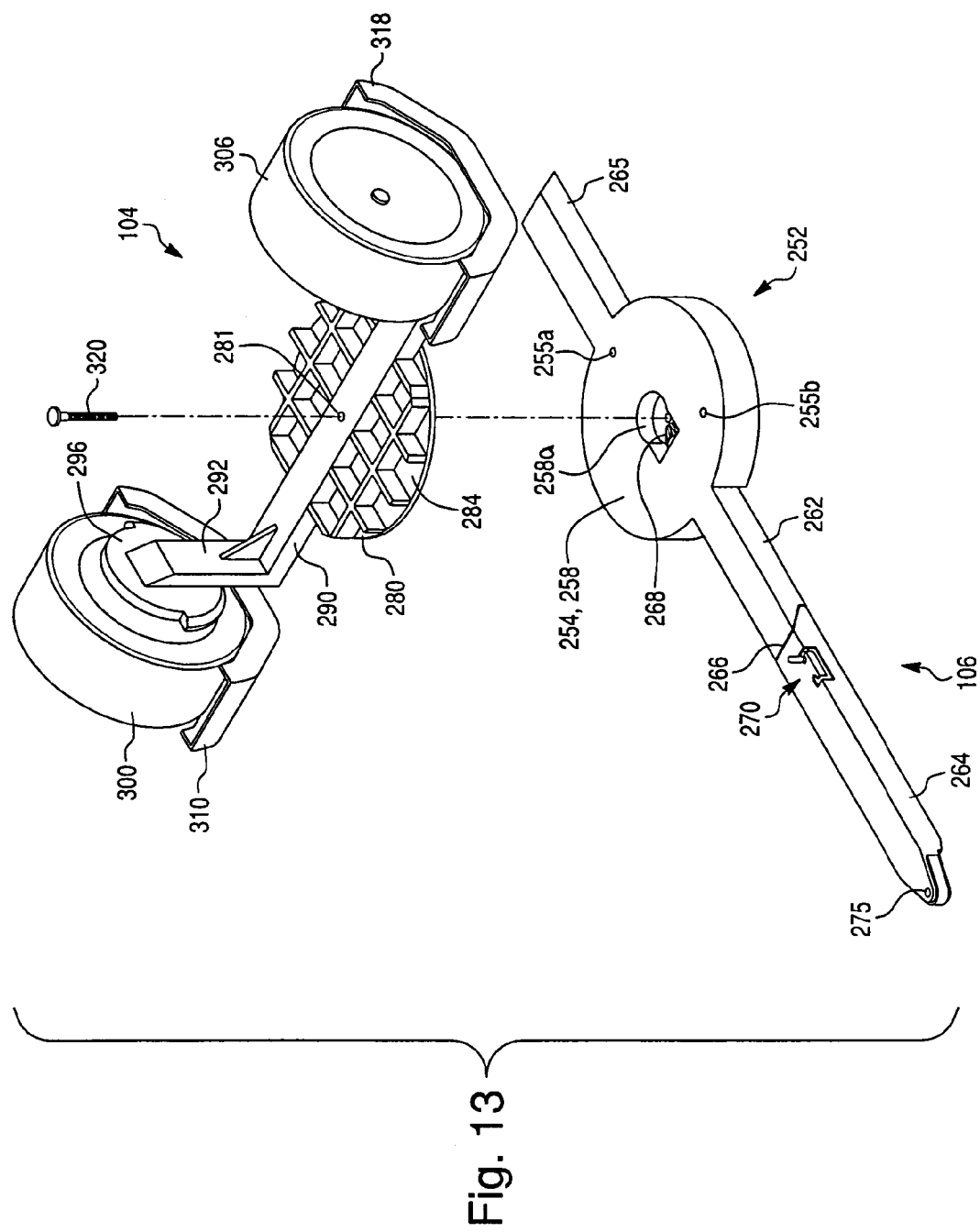
FIG. 13 is an exploded, bottom perspective view of the wheel subassembly, drawbar, and related components of the embodiment of FIG. 1.

The wheel subassembly 104 comprises a wheel-mount carriage 280 situated below the drawbar mount 252. Preferably, the carriage 280 is circular and has an outer diameter equal in dimension to that of the drawbar mount 252. The carriage 280 has an upper surface 282 and a lower surface 284, the lower surface 284 having a matrix frame (unnumbered). A central aperture 281 and first and second radial apertures 280b and 280c (FIG. 12) extend between the upper and lower surfaces 282 and 284. The upper surface 282 abuts against the lower surface 258 of the drawbar mount 252. The upper surface 282 of the carriage 280 is provided with a recess (not shown) communicating with the central aperture 281. A central gear 288 is fixedly seated in the recess and protrudes into the central recess 258a to intermesh with the rotatable gear 268. A bearing arrangement (not shown) optionally may be included to promote rotational movement of the drawbar mount 252 relative to the wheel subassembly 104.

Wheel-support member 290 extends diametrically across and is fixed to the carriage 280. Legs 292 and 294 are transversely fixed at opposite ends of the wheel-support member 290 and extend downward. Plate 296 and a spindle rotatably connect the leg 292 to a first wheel 300. Plate 302 and a spindle rotatably connect the leg 294 to a second wheel 306. The wheel assembly 104 further comprises wheel guards 308 and 310 fixedly attached to plates 296 and 302, respectively, to protect wheels 300 and 306, respectively. Brake lights 312 and 314 are mounted on the wheel guards 308 and 310.

A fastener 320 interconnects the platform mount 250, the drawbar mount 252, and the wheel-mount carriage 280. A non-exhaustive list of fasteners 320 that may be used includes screws, bolts, rivets, and the like.

The drawbar mount 252 and the wheel-mount carriage 280 are preferably independently rotatable (about fastener 320) relative to one another and relative to the platform mount 250, as shown in FIG. 4. For example, a comparison of FIGS. 8 and 11 illustrates the platform mount 250 (and bed subassembly 102) rotated 90 degrees relative to the drawbar mount 252 (and drawbar 104) and the wheel-mount carriage 280 (and wheel subassembly 106). FIG. 11 depicts a fully stowed view, in which the kick stand 117 is down with its feet 117a contacting the ground. Preferably, in the arrangements shown in FIGS. 8 and 11 the interface 266 is located outside the perimeter of the intermediate platform 114 to allow pivotal movement of the second drawbar portion 264 relative to the first drawbar portion 262 in each position. The drawbar 104 is also preferably arrangeable parallel to the ground and collinear with the direction of travel in the arrangements of FIGS. 8 and 11. Accordingly, the trailer assembly 100 is towable in a wide array of arrangements and in the folded and extended configurations.

The trailer assembly 100 further comprises a long keylock 360 and a short keylock 362. The long and short keylocks 360 and 362 permit selective locking and unlocking of the bed subassembly 102, the wheel subassembly 104, and the drawbar 106 relative to one another, as described below.

For example, the relative rotational positions of the bed subassembly 102, the wheel subassembly 104, and the drawbar 106 may be locked in the arrangement shown in FIG. 1 as follows. The long keylock 360 is inserted into an end of the arcuate slot 250a and through the first radial aperture 255a of the drawbar mount 252 and the first radial aperture 280a of the carriage 280, as illustrated in FIGS. 1, 5, and 7. In this position, the long keylock 360 locks the rotational position (and hence prevents rotation) between the wheel subassembly 104 and the drawbar 106. The short keylock 362 is illustrated in FIG. 1 as extending through the radial aperture 250b of the platform mount 250 and the second radial aperture 255b of the drawbar mount 252 to prevent relative rotational movement between the bed subassembly 102 and the drawbar 106. (Alternatively, the long keylock 360 may be inserted through the radial aperture 250b, the second radial aperture 255b, and the second radial aperture 280b to prevent rotational movement of the bed subassembly 102, the wheel subassembly 104, and the drawbar 106 relative to one another.)

The relative rotational positions of the wheel subassembly 104 and the drawbar 106 may be locked relative to one another, while permitting independent rotation of the bed subassembly 102 over a 90 degree path between the arrangements of FIGS. 8 and 11 as follows. The short keylock 362 is withdrawn from the radial aperture 250b of the platform mount 250 and the second radial aperture 255b of the drawbar mount 252. As a consequence, the short keylock 362 no longer obstructs relative rotational movement between the bed subassembly 102 and the drawbar 106. On the other hand, the long keylock 360 is retained in the arcuate slot 250a and through the first radial aperture 255a of the drawbar mount 252 and the first radial aperture 280a of the carriage 280, as illustrated in FIGS. 1, 5, and 7. In this position, the long keylock 360 locks the relative rotational position of the wheel subassembly 104 and the drawbar 106. However, the arcuate slot 250a permits the long keylock 360 and the bed subassembly 102 to rotate 90 degrees relative to the interlocked wheel subassembly 104 and drawbar 106. The short keylock 362 is optionally then reinserted through the radial aperture 250b and inserted through the third radial aperture 255c of the drawbar mount 252 to lock the bed subassembly 102 relative to the drawbar 106 and the wheel subassembly 104.

The relative rotational positions of the bed subassembly 102 and the drawbar 106 may be locked relative to one another, while permitting independent rotation of the wheel subassembly 104 over a 360 degree path as follows. The short keylock 362 is retained in the radial aperture 250b of the platform mount 250 and the second radial aperture 255b of the drawbar mount 252. As described above, the short keylock 362 prevents relative rotational movement between the bed subassembly 102 and the drawbar. On the other hand, the long keylock 360 is removed from the position shown in FIG. 1, that is, the long keylock 360 is withdrawn from the arcuate slot 250a, the first radial aperture 255a of the drawbar mount 252, and the first radial aperture 280a of the carriage 280. Withdrawal of the long keylock 360 in such manner permits the wheel subassembly 104 to freely rotate relative to the interlocked bed subassembly 102 and drawbar 106.

Withdrawal of the long keylock 360 and the short keylock 362 permits the bed subassembly 102, the wheel subassembly 104, and the drawbar 106 to be freely and independently rotated relative to one another. Various other positional combinations of the bed subassembly 102, the wheel subassembly 104, and the drawbar 106 may be retained using the various radial apertures identified above.

In its broadest aspects, several variations and modifications to the illustrated embodiment of the trailer assembly 100 can be implemented without departing from the scope of the present invention. For example, one or more of the side panels 118, 120, 154, 156, 194, and/or 196 may be omitted or made stationary or moveable. The side panels 154, 156, 194, and 196 may be omitted so that the intermediate side panels 118 and 120 function as the sides of the enclosed compartment when the trailer assembly 100 is placed in its folded configuration. The intermediate section 108, forward section 110, and aft section 112 may be split into subsections, or additional sections may be added to the bed subassembly 102. Optionally, the trailer assembly 100 may be modified to eliminate the independent rotational movement between the bed subassembly 102, the wheel subassembly 104, and/or the drawbar 106. Alternative or additional latching mechanisms and devices may be selected. The first and second drawbar portions 262 and 264 may optionally be coupled in a telescoping manner to facilitate stowage. The wheel subassembly may comprise additional wheels. These are but a few of the modifications and variations that may be implemented.

The trailer assembly 100 may undertake various sizes. According to one contemplated embodiment, in the folded configuration the trailer assembly measures about 4 feet in height (from wheel base to top of closed end gates), 4 feet in length, and 3 feet in width. Other sizes and scales are possible, and may be selected based on various factors, including the intended use of the trailer assembly 100. The versatility of the trailer assembly 100 makes it suitable for use in various settings, including for contractors, residential, and landscaping projects.

Figure 16A:
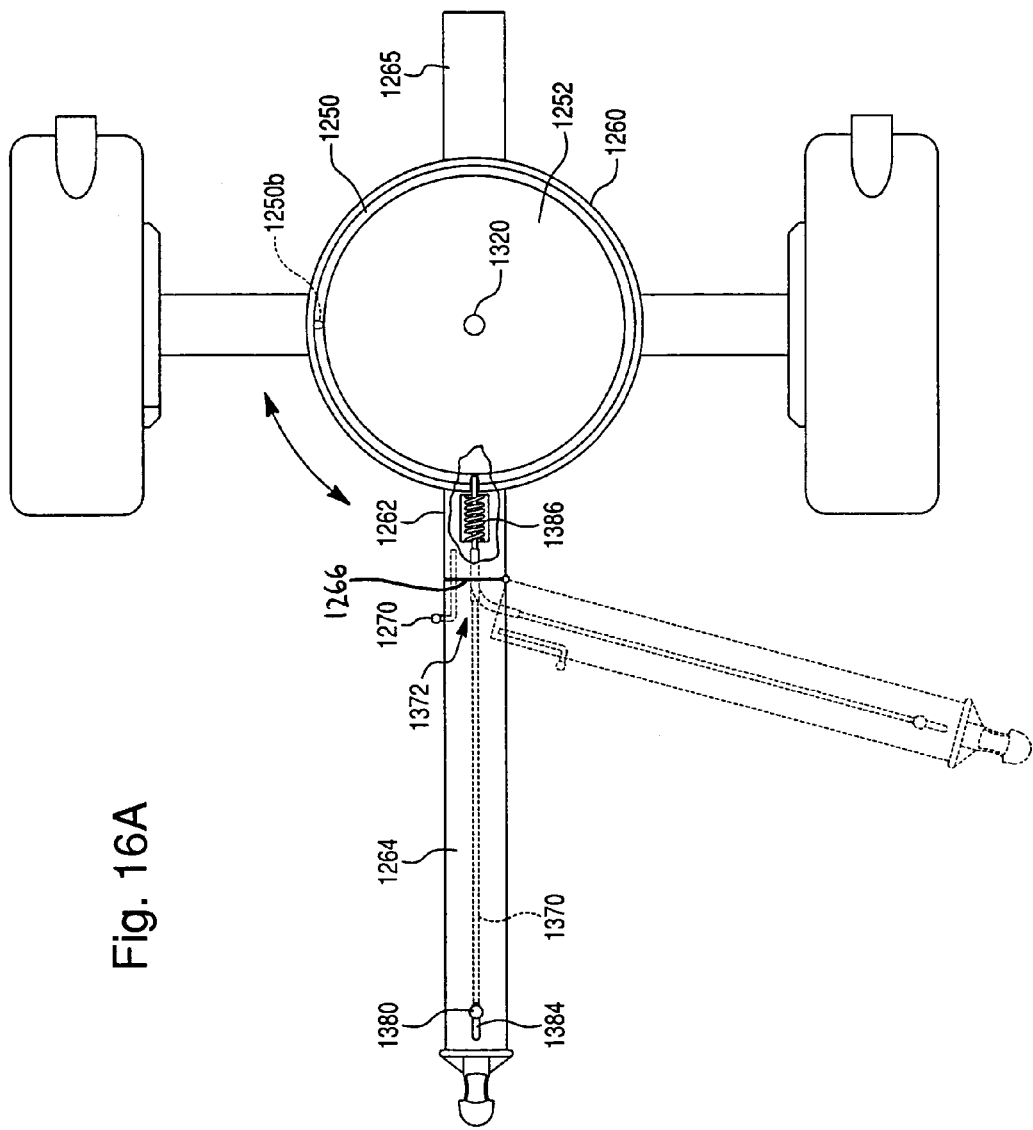
FIGS. 16A and 16B are respectively an overhead view and an overhead enlarged view of an alternative locking and drawbar system.
Figure 16B:
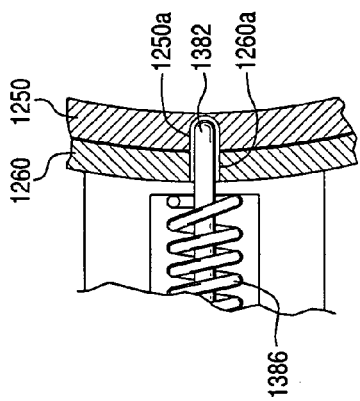

Alternative embodiments of the drawbar 106 and keylocks are illustrated in FIGS. 16A and 16B. The drawbar of the illustrated alternative embodiment comprises first, second, and third drawbar portions 1262, 1264, and 1265. The first and third drawbar portions 1262 and 1265 diametrically oppose one another on opposite sides of substantially annular perimeter wall 1260 of a drawbar mount 1252. Annular platform mount wall 1250 carrying the bed subassembly (not shown in FIGS. 16A and 16B) is seated on the upper surface of the drawbar mount 1252 within the drawbar mount perimeter wall 1260. The mount wall 1250 and drawbar mount 1252 are freely and independently rotatable relative to one another.

The first and second drawbar portions 1262 and 1264 have respective, aligning channels (not shown) through which an elongated locking pin 1370 extends. The locking pin 1370 has a first end (unnumbered) coupled to a knob 1380 protruding from the channel of the second drawbar portion 1264, and an opposite second end 1382 receivable in aligning notches 1250a and 1260a. Adjacent the knob 1380 and coextensive with the channel of the second drawbar portion 1264 is slot 1384, through which the knob 1380 is movable, as described below. A biasing member, illustrated as spring 1386 in FIGS. 16A and 16B, situated in the channel of the first drawbar portion 1262 urges the second end 1382 of the locking pin 1370 into aligning notches 1250a and 1260a.

The first and second drawbar portions 1262 and 1264 are articulated at interface 1266 for pivoting relative to one another between collinear and angled relationships, as shown in FIG. 16A. In the collinear relationship, the first and second drawbar portions 1262 and 1264 are in a collinear state. Latching mechanism 1270 permits the drawbar portions 1262 and 1264 to be locked in their collinear state. When the latching mechanism 1270 is unlocked, the second drawbar portion 1264 is pivotal at the interface 1266 into the angled relationship. The locking pin 1370 bends or otherwise deforms when in the angled state. Various embodiments for permitting this bending movement are illustrated in FIGS. 17A to 17C. For example, FIG. 17A illustrates the locking pin 1370 comprising a portion 1372 made of reinforced, elastically deformable rubber that is bendable over a 90 degree arc. FIG. 17B illustrates another embodiment, in which the locking pin 1370 comprises a bendable, resilient spring portion 1374. The embodiment of the locking pin 1370 illustrated in FIG. 17C comprises a steel U-joint 1376 capable of articulating about 90 degrees about axis 1378.

The locking pin 1370 in the alternative embodiment of FIGS. 16A and 16B also functions to replace keylocks 360 and 362. In FIGS. 16A and 16B, the second end 1382 of the locking pin 1370 is received in aligned notches 1250a and 1260a to lock the relative rotational position of the bed subassembly relative to the drawbar and wheel subassembly. The spring 1386 maintains the second end 1382 of the locking pin 1370 into aligned notches 1250a and 1260a, until the knob 1380 is slid axially along slot 1384. After the second end 1382 is withdrawn from the aligned notches 1250a and 1260a, the mount wall 1250 on which the bed subassembly is carried is rotatable 90 degrees (or more) about fastener 1320 to align notches 1250b and 1260a with one another. The knob 1380 of the locking pin 1370 may then be released to permit the spring 1386 to urge the second end 1382 of the locking pin 1370 into locking position, i.e., mating the notches 1250b and 1260a. Advantageously, the alternative embodiment of FIGS. 16A and 16B conveniently permits locking and unlocking of the relative rotational positions between the drawbar/wheel subassembly and the bed subassembly from outside the bed compartment, even when the compartment is filled with goods and items.

An embodiment of a method for making the trailer assembly of an embodiment of the invention is described below. It is to be understood that the trailer assembly of this invention is not limited to the following embodiment, and that different methods may be practiced for making this and other embodiments of the trailer assembly of the present invention. The bed subassembly 102, wheel subassembly 104, and drawbar 106 may be made of any suitable material, such as metal, wood, plastic, and the like. The first and second wheels 300 and 306 may be made of rubber, for example. The stationary parts of the bed subassembly 102 may be joined to one another with mechanical fasteners or by bonding techniques, such as welding. The movable parts of the bed subassembly 102 are connected to one another by a series of hinges (e.g., 151, 191, 119, 155, 195). The elongated hinges shown in the illustrated embodiment may be replaced by one or more shorter hinges, or other pivoting or rotational mechanisms. The central apertures of the circular platform mount 250, the drawbar mount 252, and the wheel-mount carriage 280 are aligned with one another, and fastener 320 is placed through the central apertures and locked in place.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A trailer assembly comprising a bed subassembly comprising a plurality of sections movably coupled to one another for permitting movement between an extended configuration and a folded configuration, wherein in the folded configuration the plurality of sections collectively form a bottom surface, an upper surface, and surrounding side walls of an enclosable compartment, and wherein at least one of the sections which forms the upper surface comprises a closable access member movable between an open position and a closed position for selectively permitting access to and sealing of the compartment, respectively, from above the bed subassembly while the sections are maintained in the folded configuration.

2. A trailer assembly according to claim 1, further comprising a wheel subassembly carrying the bed subassembly.

3. A trailer assembly according to claim 2, further comprising a drawbar coupled to at least one of the bed subassembly and wheel subassembly for permitting towing of the trailer assembly behind a vehicle when the bed subassembly is in both the extended and folded configurations.

4. A trailer assembly according to claim 3, wherein the bed subassembly and the wheel subassembly are freely rotatable relative to one another.

5. A trailer assembly according to claim 1, wherein:
the closable access member is a first closable access member; and
at least one of the sections forming the surrounding side walls comprises a second closable access member movable between an open position and a closed position for selectively permitting access to and sealing of the compartment, respectively, from a side of the bed subassembly while the sections are maintained in the folded configuration.

6. A trailer assembly comprising:
a bed subassembly comprising a forward section comprising a forward section inner surface and a forward gate substantially transverse to the forward section inner surface, an aft section comprising an aft section inner surface and an aft gate substantially transverse to the aft section inner surface, and an intermediate section comprising an intermediate section inner surface, the forward and aft sections being movably connected to the intermediate section between an extended configuration, in which the intermediate section inner surface is interposed between and substantially parallel with the forward section inner surface and the aft section inner surface, and a folded configuration, in which the forward and aft section inner surfaces are in substantially transverse relationship to the intermediate section inner surface and in which the forward, intermediate, and aft sections collectively form an enclosed compartment, wherein a member selected from the group consisting of the forward section, the aft section, and the intermediate section comprises a closable access member movable between an open position and a closed position for selectively permitting access to and sealing of the enclosed compartment, respectively, as the sections are maintained in the folded configuration; and
a wheel subassembly supporting the bed subassembly for moving the bed subassembly along the ground.

7. A trailer assembly according to claim 6, wherein the forward and aft gates are pivotal, when the trailer assembly is in the folded configuration, between the open position, in which the forward and aft gates face one another and are substantially parallel to the forward section inner surface and the aft section inner surface, respectively, and the closed position, in which the forward and aft gates are spaced apart from and face the intermediate section inner surface.

8. A trailer assembly according to claim 7, further comprising gate latching mechanisms for locking the forward and aft gates in the open position and preventing pivotal movement of the forward and aft gates into the closed position.

9. A trailer assembly according to claim 6, wherein:
the forward section comprises a pair of forward side panels positionable on opposite sides of and in substantially transverse relationship to the forward section inner surface;
the aft section comprises a pair of aft side panels positionable on opposite sides of and in substantially transverse relationship to the aft section inner surface; and
the forward and aft side panels define opposing sides of the enclosed compartment when the trailer assembly is in the folded configuration.

10. A trailer assembly according to claim 9, wherein at least one of the forward side panels and the aft side panels is pivotal relative to the forward section inner surface and the aft section inner surface, respectively, and constitutes the closable access member.

11. A trailer assembly according to claim 6, wherein the intermediate section comprises a pair of intermediate side panels on opposite sides and in substantially transverse relationship to the intermediate section inner surface.

12. A trailer assembly according to claim 6, further comprising a drawbar extensible substantially parallel to the intermediate section inner surface when the trailer assembly is in the extended and folded configuration for permitting towing of the trailer assembly.

13. A trailer assembly according to claim 6, wherein the intermediate section further comprises an intermediate section outer surface and a plurality of apertures extending from the intermediate section inner surface to the intermediate section outer surface.

14. A trailer assembly according to claim 6, wherein:
the forward section further comprises a forward section outer surface and a plurality of forward apertures extending from the forward section inner surface to the forward section outer surface; and
the aft section further comprises an aft section outer surface and a plurality of aft apertures extending from the aft section inner surface to the aft section outer surface.

15. A trailer assembly according to claim 14, wherein the intermediate section further comprises an intermediate section outer surface and a plurality of apertures extending from the intermediate section inner surface to the intermediate section outer surface.

16. A Wailer assembly according to claim 15, further comprising at least one stabilizing,member extending between a first aperture of the plurality of forward apertures and a second aperture of the plurality of aft apertures.

17. A trailer assembly according to claim 7, further comprising a cover extending between the forward and aft gates when in the open position.

18. A trailer assembly comprising:
a bed subassembly comprising a forward section comprising a forward section inner surface and a forward gate substantially transverse to the forward section inner surface, an aft section comprising an aft section inner surface and an aft gate substantially transverse to the aft section inner surface, and an intermediate section comprising an intermediate section inner surface, the forward and aft sections being movably connected to the intermediate section between an extended configuration, in which the intermediate section inner surface is interposed between and substantially parallel to the forward section inner surface and the aft section inner surface, and a folded configuration, in which the forward and aft section inner surfaces are in substantially transverse relationship to the intermediate section inner surface and in which the forward, intermediate, and aft sections collectively form an enclosed compartment;
a wheel subassembly rotatably supporting the bed subassembly for moving the bed subassembly along the ground when in the extended and folded configurations, the wheel subassembly comprising first and second wheels for making contact with and moving across the ground, and a wheel-mount carriage on which the bed subassembly is rotationally mounted for rotating the bed subassembly at least 90 degrees relative to the wheel subassembly;
a drawbar mount rotatably connected to the wheel-mount carriage to permit rotational movement of the cirawbar mount relative to and independently of the wheel subassembly and the bed subassembly; and
a drawbar connected to the drawbar mount for permitting pulling of the bed subassembly via the drawbar when in the extended and folded configurations.

19. A trailer assembly according to claim 18, wherein the intermediate section further comprises an intermediate section outer surface and a plurality of apertures extending from the intermediate section inner surface to the intermediate section outer surface.

20. A trailer assembly according to claim 18, wherein:
the forward section further comprises a forward section outer surface and a plurality of forward apertures extending from the forward section inner surface to the forward section outer surface; and
the aft section further comprises an aft section outer surface and a plurality of aft apertures extending from the aft section inner surface to the aft section outer surface.

21. A trailer assembly according to claim 20, wherein the intermediate section further comprises an intermediate section outer surface and a plurality of apertures extending from the intermediate section inner surface to the intermediate section outer surface.

22. A trailer assembly according to claim 19, wherein in the folded configuration the forward and aft gates are movable into an open position for permitting access to the compartment, and wherein the trailer assembly further comprises a cover extending between the forward and aft gates when in the open position.

23. A trailer assembly comprising
a bed subassembly comprising a forward section comprising a forward section inner surface and a forward gate substantially transverse to the forward section inner surface, an aft section comprising an aft section inner surface and an aft gate substantially transverse to the aft section inner surface, and an intermediate section comprising an intermediate section inner surface, the forward and aft sections being movably connected to the intermediate section between an extended configuration, in which the intermediate section inner surface is interposed between and substantially parallel to the forward section inner surface and the aft section inner surface, and a folded configuration, in which the forward and aft section inner surfaces are in substantially transverse relationship to the intermediate section inner surface and in which the forward, intermediate, and aft sections collectively form an enclosed compartment;
a wheel subassembly rotatably supporting the bed subassembly for moving the bed subassembly along the ground when in the extended and folded configurations, the wheel subassembly comprising first and second wheels for making contact with and moving across the ground, and a wheel-mount carriage on which the bed subassembly is rotationally mounted for rotating the bed subassembly at least 90 degrees relative to the wheel subassembly; and
at least one stabilizing member,
wherein the forward section further comprises a forward section outer surface and a plurality of forward apertures extending from the forward section inner surface to the forward section outer surface,
wherein the aft section further comprises an aft section outer surface and a plurality of aft apertures extending from the aft section inner surface to the aft section outer surface,
wherein the intermediate section further comprises an intermediate section outer surface and a plurality of apertures extending from the intermediate section inner surface to the intermediate section outer surface, and
wherein the stabilizing member extends between a first aperture of the plurality of forward apertures and a second aperture of the plurality of aft apertures.

24. A trailer assembly comprising a bed subassembly movable between an extended configuration and a folded configuration, the bed subassembly comprising an intermediate section that serves as a first bottom portion in the extended and folded configurations, and forward and aft sections movably coupled to opposite ends of the intermediate section for serving as second and third bottom portions in the extended position and side and end walls surrounding a compartment in the folded configuration, wherein the forward and aft sections are in substantially non-overlapping relationship with one another in the folded configuration.

25. A trailer assembly according to claim 24, further comprising a wheel subassembly carrying the bed subassembly.

26. A trailer assembly according to claim 25, further comprising a drawbar coupled to at least one of the bed subassembly and wheel subassembly for permitting towing of the trailer assembly behind a vehicle.

27. A trailer assembly according to claim 26, wherein the bed subassembly and the wheel subassembly are freely rotatable relative to one another.

28. A trailer assembly movable between an extended configuration and a folded configuration, the trailer assembly comprising a bed subassembly comprising:
(a) an intermediate section comprising an intermediate platform structure having an intermediate platform inner surface, front and rear end portions opposite to one another, and opposite sides;
(b) a forward section comprising a forward platform inner surface and a forward end gate positionable in a closed position substantially transversely to the forward platform inner surface, the forward section being movably connected to the front end portion of the intermediate section to permit movement between the extended configuration, in which the forward platform inner surface is substantially parallel to the intermediate platform inner surface, and the folded configuration, in which the forward platform inner surface is above and substantially transverse to the intermediate platform inner surface and in which the forward end gate in the closed position is spaced apart from and faces the intermediate platform inner surface; and
(c) an aft section comprising an aft platform inner surface and an aft end gate positionable in a closed position substantially transversely to the aft platform inner surface, the aft section being movably connected to the rear end portion of the intermediate section to permit movement between the extended configuration, in which the aft platform inner surface is substantially parallel to the intermediate platform inner surface, and the folded configuration, in which the aft platform inner surface is above and substantially transverse to the intermediate platform inner surface and in which the aft end gate in the closed position is spaced apart from and faces the intermediate platform inner surface and is arranged in substantially non-overlapping relationship with the forward end gate.

29. A trailer assembly according to claim 28, wherein the intermediate section further comprises first and second intermediate side panels situated on the opposite sides of the intermediate platform structure and positionable substantially transversely to the intermediate platform inner surface to face one another.

30. A trailer assembly according to claim 29, wherein the first intermediate side panel is pivotally connected to the intermediate platform structure.

31. A trailer assembly according to claim 28, wherein the aft section further comprises first and second aft side panels situated on opposite sides of the aft platform structure and positionable substantially transversely to the aft platform inner surface to face one another, and wherein the aft end gate extends between the first and second aft side panels.

32. A trailer assembly according to claim 31, wherein the forward section further comprises first and second forward side panels situated on opposite sides of the forward platform structure and positionable substantially transversely to the forward platform inner surface to face one another, and wherein the forward end gate extends between the first and second forward side panels.

33. A trailer assembly according to claim 28, wherein the forward and aft end gates respectively comprise forward and aft distal edges remote from the forward and aft platform inner surfaces, respectively, and further wherein the forward and aft distal edges abut one another to establish a roof structure for the trailer assembly when the forward and aft sections are in the folded configuration.

34. A trailer assembly according to claim 28, wherein the aft platform comprises an aft end, and wherein the aft end gate is pivotal relative to the aft end of the aft platform into substantially parallel relationship with the aft platform inner surface when the trailer assembly is in the extended and folded configurations.

35. A trailer assembly according to claim 34, wherein the forward platform structure comprises a forward end, and wherein the forward gate is pivotal relative to the forward end of the forward platform structure into substantially parallel relationship with the forward platform inner surface when the trailer assembly is in the extended and folded configurations.

36. A trailer assembly according to claim 28, wherein the intermediate platform inner surface has a first length extending from the front end portion to the rear end portion, wherein the forward gate has a second length extending from a proximal edge of the forward gate adjacent the forward platform inner surface to a distal edge of the forward gate remote from the forward platform inner surface, wherein the aft gate has a third length extending from a proximal edge of the aft gate adjacent the aft platform inner surface to a distal edge of the aft gate remote from the aft platform inner surface, and wherein the first length is approximately equal to the sum of the second length and the third length.

37. A trailer assembly according to claim 28, further comprising a wheel subassembly comprising first and second wheels for making contact with and moving across the ground, the wheel subassembly being freely and independently rotatable relative to the bed subassembly.

38. A trailer assembly according to claim 37, further comprising a drawbar freely and independently rotatable relative to the bed and wheel subassemblies.

39. A trailer assembly according to claim 28, wherein the intermediate platform structure further comprises an intermediate platform outer surface and a plurality of apertures extending from the intermediate platform inner surface to the intermediate platform outer surface.

40. A trailer assembly movable between an extended configuration and a folded configuration, the trailer assembly comprising a bed subassembly comprising:
(a) an intermediate section comprising
(i) an intermediate platform structure comprising an intermediate platform inner surface, front and rear end portions opposite to one another, and opposite sides; and
(ii) optionally first and second intermediate side panels situated on the opposite sides of the intermediate platform structure and positionable substantially transversely to the intermediate platform inner surface to face one another, the first intermediate side panel being rotatable away from the second intermediate side panel;
(b) a forward section comprising
(i) a forward platform structure comprising a forward platform inner surface, the forward section being rotatably connected to the front end portion of the intermediate section to permit rotational movement between the extended configuration, in which the forward platform inner surface is substantially parallel to the intermediate platform inner surface, and the folded configuration, in which the forward platform inner surface is above and substantially transverse to the intermediate platform inner surface; and
(ii) optionally first and second forward side panels situated on opposite sides of the forward platform structure and positionable substantially parallel to the first and second intermediate side panels, respectively, and substantially transversely to the forward platform inner surface to face one another, the first forward side panel being rotatable away from the second forward side panel; and
(c) an aft section comprising
(i) an aft platform structure comprising an aft platform inner surface, the aft section being rotatably connected to the rear end portion of the intermediate section to permit rotational movement between the extended configuration, in which the aft platform inner surface is substantially parallel to the intermediate platform inner surface, and the folded configuration, in which the aft platform inner surface is above and substantially transverse to the intermediate platform inner surface; and
(ii) optionally first and second aft side panels situated on opposite sides of the aft platform structure and positionable substantially parallel to the first and second intermediate side panels, respectively, and substantially transversely to the aft platform inner surface to face one another, the first aft side panel being rotatable away from the second aft side panel,
wherein the trailer assembly includes at least one of the side panels selected from the group consisting of the first and second intermediate side panels, the first and second forward side panels, and the first and second aft side panels.

41. A trailer assembly according to claim 40, wherein the trailer assembly includes the first and second intermediate side panels rotatable into substantially coplanar relationship with the intermediate platform inner surface.

42. A trailer assembly according to claim 40, wherein the trailer assembly includes each of the first and second intermediate side panels, the first and second forward side panels, and the first and second aft side panels.

43. A trailer assembly according to claim 40, wherein the aft section further comprises (c)(iii) an aft end gate extending between the first and second aft side panels and positionable substantially transversely to the aft platform inner surface, the aft end gate facing and being spaced apart from the intermediate platform inner surface when in the folded configuration.

44. A trailer assembly according to claim 43, wherein the forward section further comprises (b)(iii) a forward end gate extending between the first and second forward side panels and positionable substantially transversely to the forward platform inner surface, the forward end gate facing and being spaced apart from the intermediate platform inner surface when in the folded configuration.

45. A trailer assembly according to claim 44, wherein the forward and aft end gates respectively comprise forward and aft distal edges remote from the forward and aft platform inner surfaces, respectively, and further wherein the forward and aft distal edges abut one another to establish a roof structure for the trailer assembly when the forward and aft sections are in the folded configuration.

46. A trailer assembly according to claim 40, further comprising a wheel subassembly comprising first and second wheels for making contact with and moving across the ground, the wheel subassembly being freely and independently rotatable relative to the bed subassembly.

47. A trailer assembly according to claim 46, further comprising a drawbar freely and independently rotatable relative to the bed and wheel subassemblies.

48. A trailer assembly movable between an extended configuration and a folded configuration, the trailer assembly comprising a bed subassembly comprising:
  (a) an intennediate section comprising an intermediate platform structure having an intermediate platform inner surface, front and rear end portions opposite to one another, and opposite sides;
  (b) a forward section comprising a forward platform inner surface and a forward end gate positionable substantially transversely to the forward platform inner surface, the forward section being rotatably connected to the front end portion of the intermediate section to permit rotational movement between the extended configuration, in which the forward platform inner surface is substantially parallel to the intermediate platform inner surface, and the folded configuration, in which the forward platform inner surface is above and substantially transverse to the intermediate platform inner surface; and
  (c) an aft section comprising an aft platform inner surface and an aft end gate, the aft section being rotatably connected to the rear end portion of the intermediate section to permit rotational movement between the extended configuration, in which the aft platform inner surface is substantially parallel to the intermediate platform inner surface, and the folded configuration, in which the aft platform inner surface is above and substantially transverse to the intermediate platform inner surface, the aft end gate being pivotal relative to the aft end of the aft platform structure for raising the aft end gate to extend substantially transverse to the aft platform inner surface and to lower the aft end gate to lie in substantially parallel relationship with the aft platform inner surface when the trailer assembly is in both the extended and folded configurations.

49. A trailer assembly according to claim 48, wherein the intermediate section further comprises first and second intermediate side panels situated on the opposite sides of the intermediate platform structure and positionable substantially transversely to the intermediate platform inner surface to face one another.

50. A trailer assembly according to claim 49, wherein the first intermediate side panel is pivotally connected to the intermediate platform structure.

51. A trailer assembly according to claim 49, wherein the aft section further comprises first and second aft side panels situated on opposite sides of the aft platform structure and positionable substantially transversely to the aft platform inner surface to face one another, and wherein the aft end gate extends between the first and second aft side panels.

52. A trailer assembly according to claim 51, wherein the forward section further comprises first and second forward side panels situated on opposite sides of the forward platform structure and positionable substantially transversely to the forward platform inner surface to face one another, and wherein the forward end gate extends between the first and second forward side panels.

53. A trailer assembly according to claim 52, wherein the forward end gate is pivotal relative to the forward platform structure for raising the forward end gate to extend substantially transverse to the forward platform inner surface and for lowering the forward end gate to lie in substantially parallel relationship with the forward platform inner surface when the trailer assembly is in both the extended and folded configurations.

54. A trailer assembly movable between an extended configuration and a folded configuration, the trailer assembly comprising:
  (a) a bed subassembly comprising
    (i) an intermediate section comprising an intermediate platform surface and first and second intermediate side panels situated on opposite sides of the intermediate platform surface, the first and second intermediate side panels being positionable substantially transversely to the intermediate platform inner surface to face one another;
    (ii) a forward section comprising a forward platform inner surface, first and second forward side panels situated on opposite sides of the forward platform inner surface and positionable substantially transversely to the forward platform inner surface to face one another, and a forward end gate extending between the first and second forward side panels and positionable in a closed position substantially transversely to the forward platform inner surface, the forward section being movably connected to the intermediate section to permit rotational movement of the forward section between the extended configuration, in which the forward platform inner surface is substantially parallel to the intermediate platform inner surface, and the folded configuration, in which the forward platform inner surface is above and substantially transverse to the intermediate platform inner surface and in which the forward end gate in the closed position faces and is spaced apart from the intermediate panel inner surface;
    (iii) an aft section comprising an aft platform inner surface, first and second aft side panels situated on opposite sides of the aft platform inner surface and positionable substantially transversely to the aft platform inner surface to face one another, and an aft end gate extending between the first and second aft side panels and positionable in a closed position substantially transversely to the aft platform inner surface, the aft section being movably connected to the intennediate section to permit rotational movement of the aft section between the extended configuration, in which the aft platform inner surface is substantially parallel to the intermediate platform inner surface, and the folded configuration, in which the aft platform inner surface is above and substantially transverse to the intermediate platform inner surface and in which the aft end gate in the closed position faces and is spaced apart from the intermediate panel inner surface;

(b) a wheel subassembly carrying the intermediate section; and (c) a drawbar coupled to a member selected from the intermediate section and the wheel subassembly, the drawbar retainable in an operative position substantially parallel with the intermediate section for pulling the bed and wheel subassemblies across the ground in both the extended configuration and the folded configuration.

55. A trailer assembly according to claim 54, wherein the bed and wheel subassemblies and the drawbar are freely and independently rotatable relative to one another.

56. A trailer assembly according to claim 54, wherein the forward and aft end gates are pivotal between an open position and the closed position.

57. A trailer assembly according to claim 54, further comprising a mechanism for securing the forward and aft end gates in the closed and open positions.

58. A trailer assembly comprising:

a bed subassembly comprising a forward section, an aft section, and an intermediate section each having a respective inner surface and a respective outer surface, the forward and aft sections being situated on opposite ends of and being movably connected to the intermediate section between an extended configuration, in which the inner surfaces of the forward, aft, and intermediate sections are substantially parallel with one another, and a folded configuration, in which the inner surfaces of the forward and aft sections are substantially transverse to the inner surface of the intermediate section, the forward and aft sections comprising a plurality of apertures extending from the inner surface to the outer surface thereof;

a wheel subassembly supporting the bed subassembly for moving the bed subassembly alone the ground; and a stabilizing bar extending through opposing apertures of the forward and aft sections.

* * * * *